US006801175B2

United States Patent
Miyamoto et al.

(10) Patent No.: US 6,801,175 B2
(45) Date of Patent: Oct. 5, 2004

(54) IMAGE FORMING APPARATUS

(75) Inventors: Hidetoshi Miyamoto, Takatsuki (JP);
Keyaki Yogome, Kyoto (JP); Masahiko Matsuura, Suita (JP); Hiroshi Mizuno, Ikoma (JP); Takaji Kurita, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 41 days.

(21) Appl. No.: 09/873,356

(22) Filed: Jun. 5, 2001

(65) Prior Publication Data

US 2001/0048416 A1 Dec. 6, 2001

(30) Foreign Application Priority Data

Jun. 5, 2000 (JP) ........................................ 2000-167071

(51) Int. Cl.⁷ ........................... G09G 3/34; B41J 29/38; G03G 15/22
(52) U.S. Cl. ........................... 345/84; 347/111; 399/130
(58) Field of Search ............................... 358/1.13, 1.16, 358/1.17, 3.01, 296, 523, 534, 1.4; 347/111; 345/84, 85, 107; 399/130, 299, 158, 131; 235/493; 101/93.29, 489; 346/74.2

(56) References Cited

U.S. PATENT DOCUMENTS

| | | | | |
|---|---|---|---|---|
| 3,633,720 A | * | 1/1972 | Tyler | 400/105 |
| 3,670,323 A | * | 6/1972 | Sobel et al. | 345/107 |
| 4,126,854 A | | 11/1978 | Sheridon | |
| 4,143,103 A | | 3/1979 | Sheridon | |
| 4,774,593 A | * | 9/1988 | Deguchi et al. | 358/301 |
| 4,888,648 A | * | 12/1989 | Takeuchi et al. | 386/52 |
| 5,115,374 A | * | 5/1992 | Hongoh | 361/681 |
| 5,844,690 A | * | 12/1998 | Terajima | 358/296 |
| 5,866,284 A | * | 2/1999 | Vincent | 430/37 |
| 5,971,519 A | * | 10/1999 | Horikoshi | 347/16 |
| 6,099,102 A | * | 8/2000 | Tanaka et al. | 347/9 |
| 6,103,347 A | * | 8/2000 | Nojima et al. | 428/174 |
| 6,330,054 B1 | * | 12/2001 | Ikami | 355/400 |
| 6,407,763 B1 | * | 6/2002 | Yamaguchi et al. | 347/112 |
| 6,498,597 B1 | * | 12/2002 | Sawano | 345/107 |
| 2002/0141801 A1 | * | 10/2002 | Shimoda et al. | 400/76 |

FOREIGN PATENT DOCUMENTS

JP          6-67570         3/1994

OTHER PUBLICATIONS

Gugrae Jo, et al., "New Toner Display Device (*I*)", The Annual Conference of the Imaging Society of Japan, 1999, pp. 249–252.

* cited by examiner

Primary Examiner—Alexander Eisen
(74) Attorney, Agent, or Firm—McDermott Will & Emery LLP

(57) ABSTRACT

An image forming apparatus including a first image forming portion for forming an image on a normal image display medium, and a second image forming portion for forming an image on a reversible image display medium.

An image forming apparatus including a reversible image display having at least an electrode for forming an image by driving an image display region, a first image forming portion for forming an image on the reversible image display, and a second image forming portion for forming an image on a reversible image display medium not having an electrode.

13 Claims, 15 Drawing Sheets

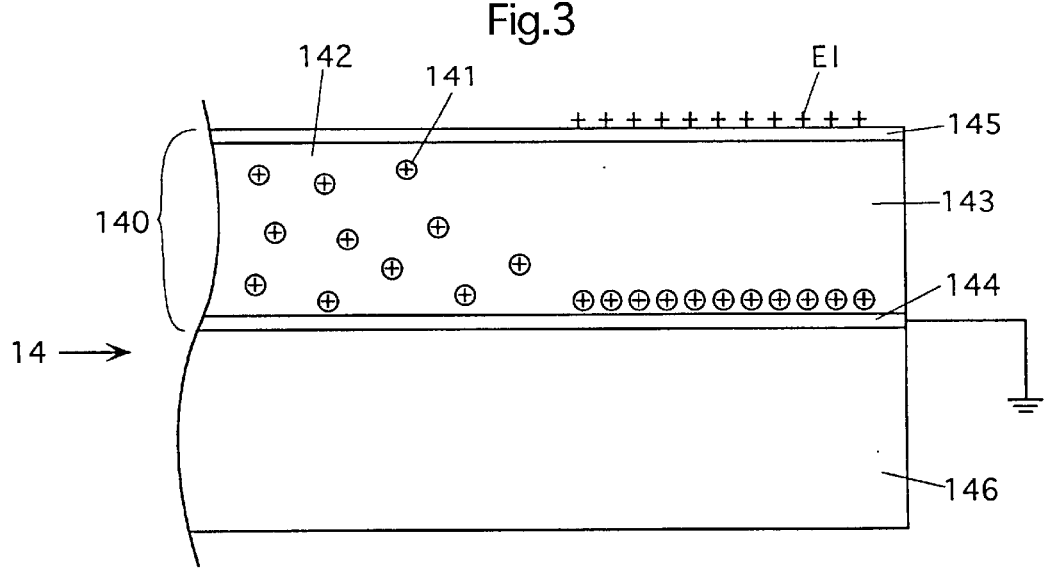
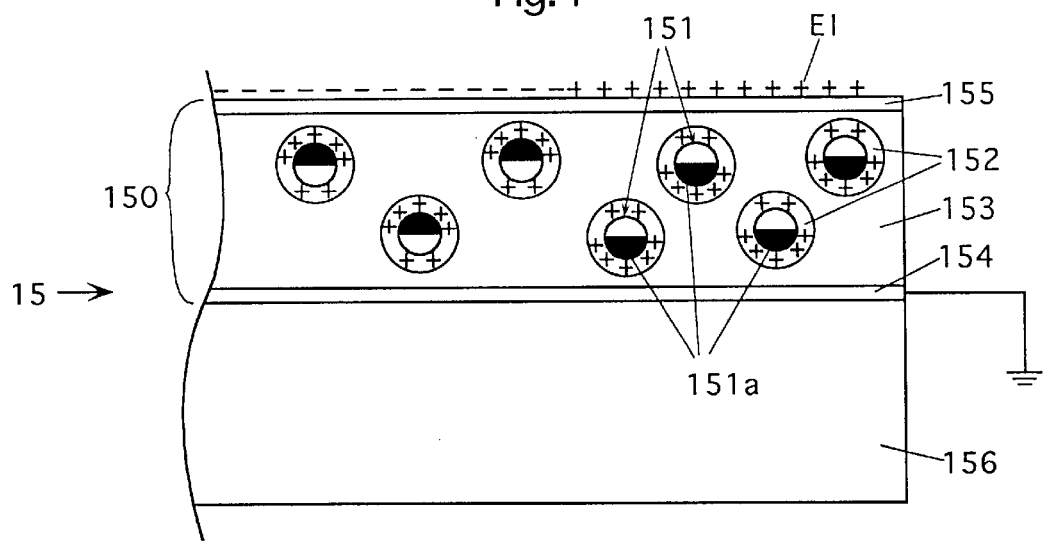
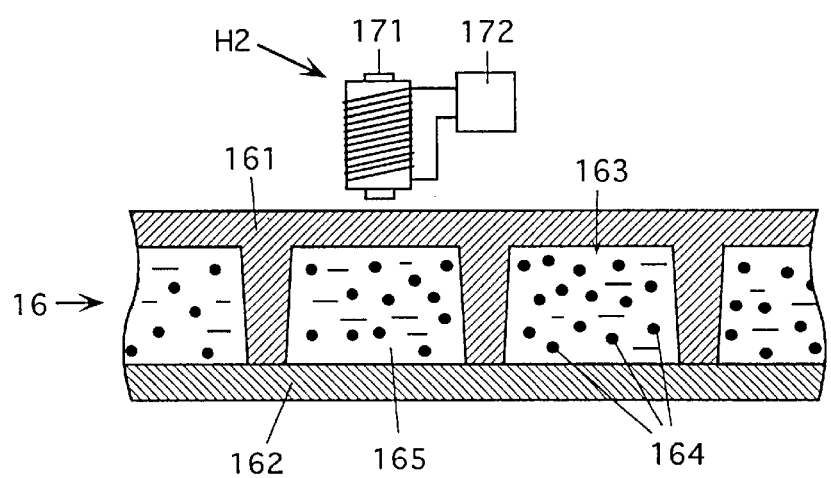

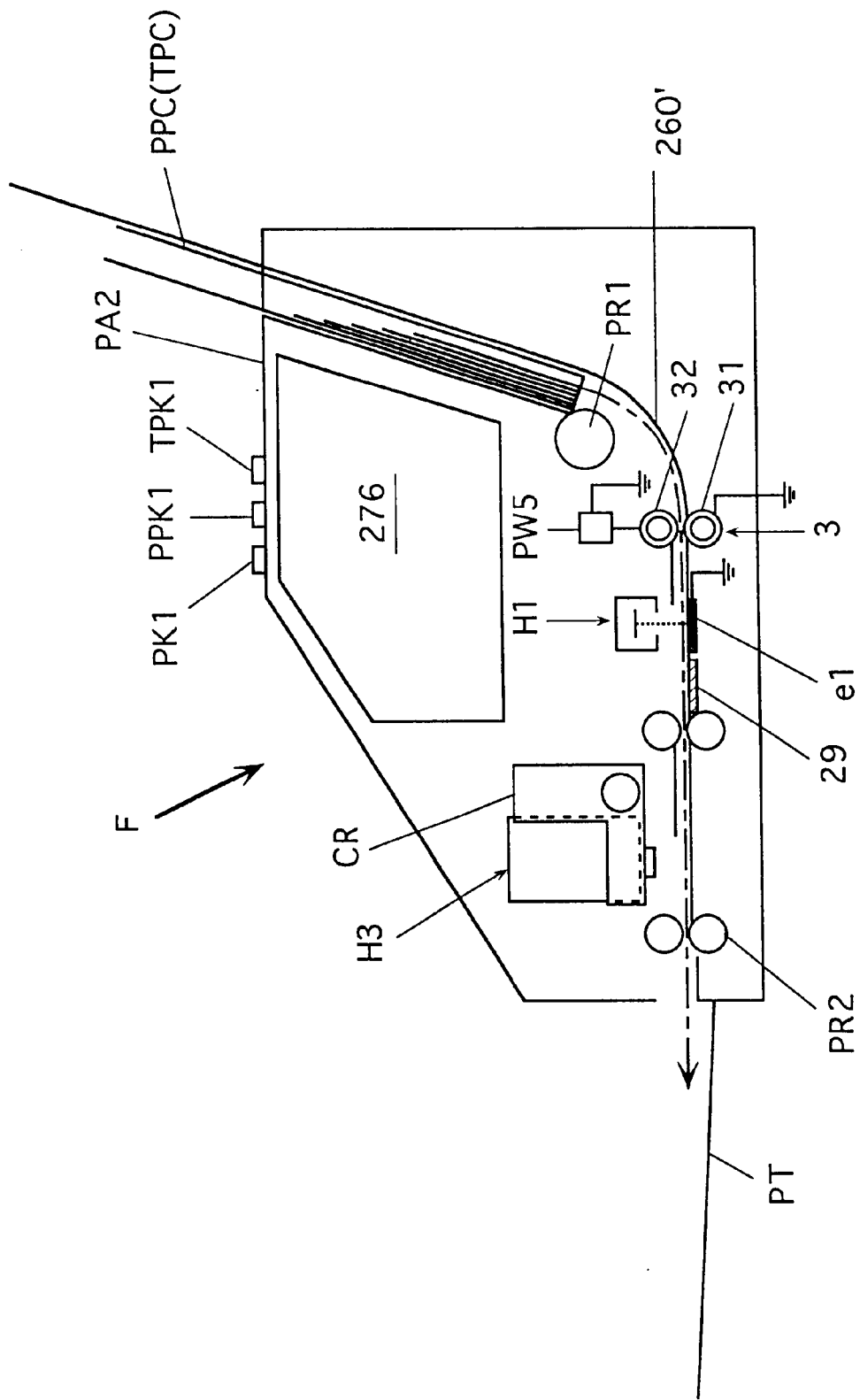

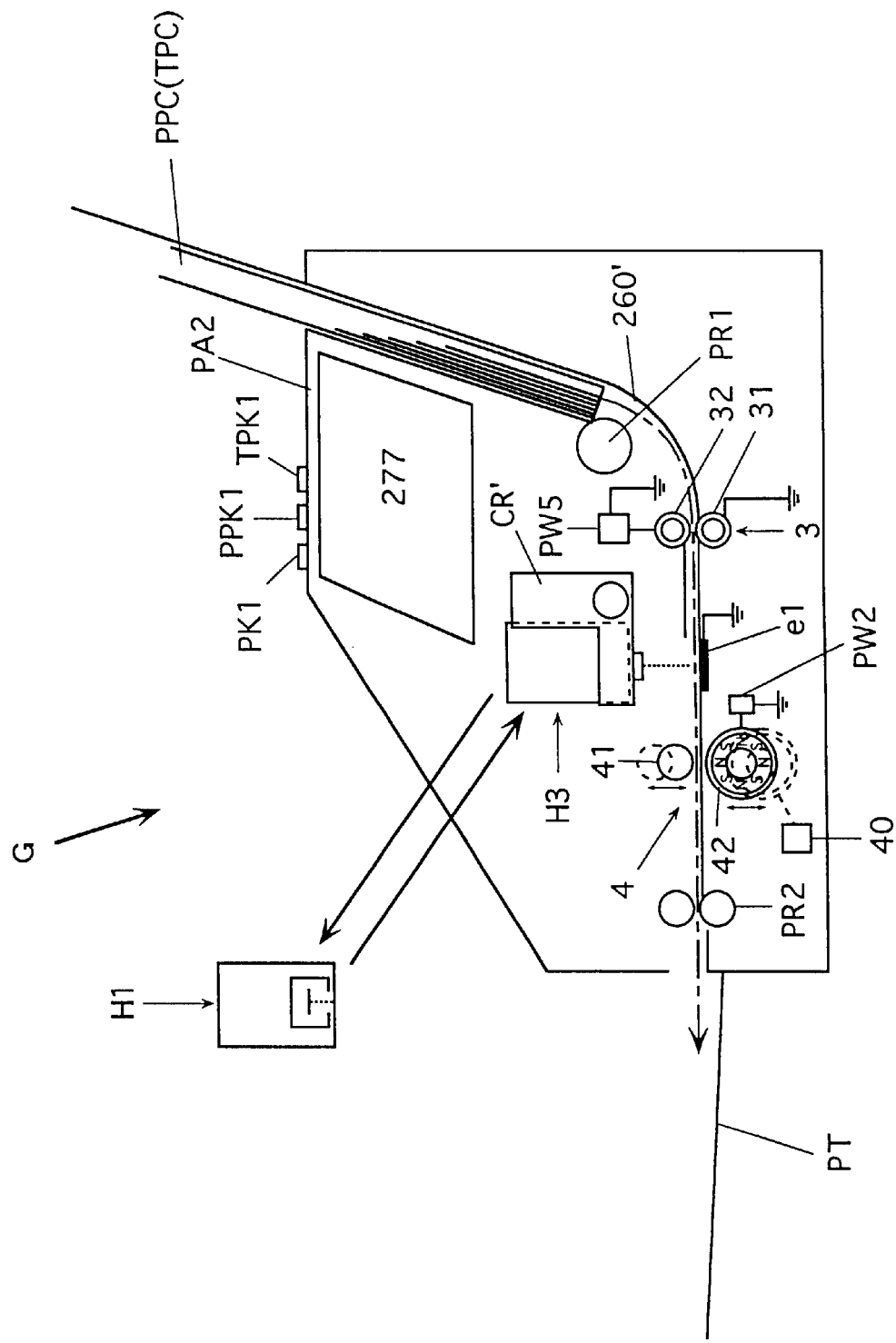

IMAGE FORMING APPARATUS

The invention is based on the patent application No. 2000-167071 Pat. filed in Japan, the contents of which are hereby incorporated by reference.

BACKGROUND OF THE INVENTION

1. Field of the Invention

The present invention relates to an image forming apparatus, which can form images on a normal image display medium such as a normal paper sheet as well as a rewritable and reversible image display medium.

Also, the invention relates to an image forming apparatus, which can form images on a reversible image display having electrodes for image display as well as a reversible image display medium not having such an electrode.

Further, the invention relates to an image forming apparatus which can form images on an image display medium in either of the draft mode and the finish mode.

2. Description of the Background Art

At present, texts, graphics or the like prepared by a computer, a word processor or the like are displayed, for example, on a CRT display or the like, or are displayed by outputting them on a medium such as a paper sheet via a printer or the like.

However, the image display on the display such as a CRT display cannot achieve high resolutions as compared with images displayed, e.g., by printers on paper sheets, and can not display images with sufficiently high clearness and accuracy. Due to relatively low resolution and light emitted from the CRT or the like, an operation viewing images displayed on the CRT or the like for a long time causes fatigue in operator's eyes.

In contrast to the above, the display of texts and graphics on the image display mediums such as paper sheets can be performed with high clearness and high resolution, and therefore can be easy-on-the-eyes image display.

For the above reasons, texts, graphics and others prepared by the computer, word processor or the like are output onto mediums such as paper sheets by a printer or the like in almost every case even when it is necessary to read only temporarily the text or the like, or the texts are a draft which may be further revised.

The mediums such as paper sheets bearing images are abandoned or burnt when they are no longer required. This results in consumption of a large mount of resources. The printer or the like also consumes a large amount of consumable products or materials such toner, ink or thermal transfer sheets. For obtaining the new display mediums such as paper sheets or the like as well as toner, ink or the like, manufacturing energies and resources are required.

This is contrary to the current demand for reduction in environmental loads.

SUMMARY OF THE INVENTION

Accordingly, an object of the invention is to provide an image forming apparatus, which can satisfy demands for reduction in environmental loads relating to required resources, energies and others as compared with conventional image forming apparatuses merely displaying images on normal image display mediums.

More specifically, an object of the invention is to provide an image forming apparatus which can form images on normal image display mediums such as normal paper sheets as well as reversible (i.e., image-writable, image-erasable and image-rewritable) image display mediums, can satisfy current demands for reduction in environmental loads relating to required resources, energies and others owing to image formation on the reversible image display mediums allowing rewriting and therefore repetitive use, and does not cause a substantial problem compared with the conventional image forming apparatus owing to conventional image formation on the normal image display mediums.

Further, an object of the invention is to provide an image forming apparatus which can form images on rewritable and reversible image display mediums, can perform rewritable output and display of images more easily and quickly than output and display of images on the reversible image display mediums depending on situations, can thereby satisfy current demands for reduction in environmental loads relating to required resources, energies and others owing to the rewritable image formation, and can be convenient owing to the image formation on the reversible image display medium as well as output and display of images in an easier and faster manner.

Further, an object of the invention is to provide an image forming apparatus which can form images on image display mediums in a so-called draft mode for forming images in an image state that contributes to reduction in environmental loads relating to required resources, energies and others, can also form images on image display mediums in a so-called finish mode for forming images in an ordinary image state, can satisfy demands for reduction in environmental loads relating to required resources, energies and others owing to image formation in the draft mode, and does not cause a substantial problem compared with the conventional image forming apparatus owing to image formation in the conventional finish mode.

The inventions provides first, second and third types of image forming apparatuses described below.

(1) First Image Forming Apparatus

A first image forming apparatus can output an image on either of normal and reversible image display mediums.

More specifically, the image forming apparatus includes a first image forming portion for forming an image on a normal image display medium, and a second image forming portion for forming an image on a reversible image display medium.

The normal image display medium is a normal paper sheet, a sheet for overhead projector or the like.

The reversible image display medium is a rewritable (i.e., image-writable, image-erasable and image-rewritable) medium such as a reversible image display medium of an electric field drive type or a magnetic drive type, or the like. The reversible image display medium will be described later.

According to this image forming apparatus, images can be formed on either of the normal image display medium and reversible image display medium. Accordingly, images to be displayed only for temporary reading as well as draft images or the like to be further revised, if necessary, can be output and displayed on the reversible image display medium, and can also be output and displayed on the conventional normal image display medium, if necessary. The completed image or the like can be output and displayed on the normal image display medium for long-term preservation, presentations and others, as is done in the prior art. In some cases, the completed images or the like can be output and displayed on the reversible image display medium. As described above, the images can be output and displayed on the reversible image display medium, which is rewritable and therefore can be reusable, so that it is possible to satisfy current demands for reduction in environmental loads relating to required resources, energies and others. Since images can be displayed on the conventional normal image display medium, no substantial disadvantage occurs similarly to the conventional image forming apparatus.

(2) Second Image Forming Apparatus

A second image forming apparatus can form images on rewritable and reversible image displays as well as rewritable and reversible image display mediums.

More specifically, the image forming apparatus includes a first image forming portion for forming an image on a rewritable and reversible image display having at least an electrode among elements for driving an image display region to form an image, and a second image forming portion for forming an image on a reversible image display medium not having an electrode.

The reversible image display having the electrode may be a panel display such as a liquid crystal display, an electroluminescence display or the like. The reversible image display may have a structure prepared by adding an electrode for image formation to the same structure as the reversible image display medium already described in connection with the image forming apparatus of the first type.

According to this second type image forming apparatus, the image can be formed on the rewritable (i.e., image-writable, image-erasable and image-rewritable) reversible image display medium.

Depending on the situation, images can be output and displayed on the reversible image display, e.g., in such cases that it is desired to determine in advance the image to be output onto the reversible image display medium, and that it is not necessary for the time being to output the image onto the reversible image display medium, but it is merely required to view the image.

The reversible image display medium and the reversible image display are both rewritable so that it is possible to satisfy demands for reduction in environmental loads relating to required resources, energies and others. The reversible image display itself has the electrode, and can be convenient owing to simple and fast image formation.

For example, when it is required to add an image to images already formed, the image can be output onto the reversible image display medium for image addition. If it is desired to view images on multiple pages at a time, the images can be output onto a plurality of multiple reversible image display mediums for viewing them at a time. If it is merely required to view successively multiple pages, this can be achieved by quickly displaying the images on the reversible image display. As described above, the image formation can be performed selectively on the reversible image display medium and the reversible image display depending on the situations. This also affords convenience.

(3) Third Image Forming Apparatus

A third image forming apparatus has a draft mode and a finish mode.

More specifically, the image forming apparatus includes:
an image data storing portion for storing image data;
a draft image forming portion for forming an image on an image display medium in a draft mode;
a finish image forming portion for forming an image on an image display medium in a finish mode; and
a draft image data forming portion for forming draft image data from the image data stored in the image data storing portion, wherein the draft image forming portion can form the image on the image display medium in accordance with the draft image data formed by the draft image data forming portion, and the finish image forming portion can form the image on the image display medium in accordance with the image data stored in the image data storing portion.

In the draft mode, the image is formed in such a state that contributes to reduction in environmental loads relating to required resources, energies and others. For executing this draft mode, the draft image forming portion forms the draft image data from the image data stored in the image data storing portion.

The draft image data differs from the image data stored in the image data storing portion, and is, for example, image data of a low resolution, monochrome image data (if the original data is color image data), image data of low-level gray scale, image data of a reduced image output area, image data for displaying (outputting) data of multiple pages on one page, image data of reduced image density (e.g., image density of a solid portion) or a combination of at least two of them.

According to this image forming apparatus, the draft image forming portion can form the image on the image display medium in the draft mode for forming the image in the state, which contributes to reduction in environmental loads relating to required resources, energies and others.

Further, the finish image forming portion can form the image on the image display medium in the finish mode for forming the image in the normal image state, and therefore no substantial disadvantage occurs similarly to the conventional image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1(A) is a cross section showing an example before image display, and FIG. 1(B) is a cross section showing an example during image display;

FIG. 3 shows an example of a structure of an image display medium of an electrophoresis type;

FIG. 4 shows an example of a structure of an image display medium of a twist ball type;

FIG. 5 shows an example of a structure of an image display medium of a magnetic drive type;

FIG. 9(A) shows a state of ion flow, and FIG. 9(B) shows a stopped state of ion flow;

FIG. 12 shows a schematic structure of further another example of the image forming apparatus;

FIG. 13 shows a schematic structure of further another example of the image forming apparatus;

FIGS. 17(A) and 17(B) are plans each showing an example of medium PP (or TP) for a draft mode allowing detection of the medium type, and FIG. 17(C) shows a manner of detecting the medium;

FIGS. 18(A) and 18(B) are plans each showing an example of medium PP (or TP) for the draft mode allowing detection of the medium type, and FIG. 18(C) shows a manner of detecting the medium;

FIG. 19(A) shows a manner of detecting the medium PP (or medium TP) for draft mode with a cassette accommodating the medium PP (or medium TP) for draft mode or the medium PP for finish mode, and FIG. 19(B) shows a manner of detecting the medium PP for finish; FIG. 20(A) shows a manner of detecting the medium PP (or medium TP) for draft mode with a cassette accommodating the medium PP (or medium TP) for draft mode or the medium PP for finish mode, and FIG. 20(B) shows a manner of detecting the medium PP for finish.

Figure 1A:
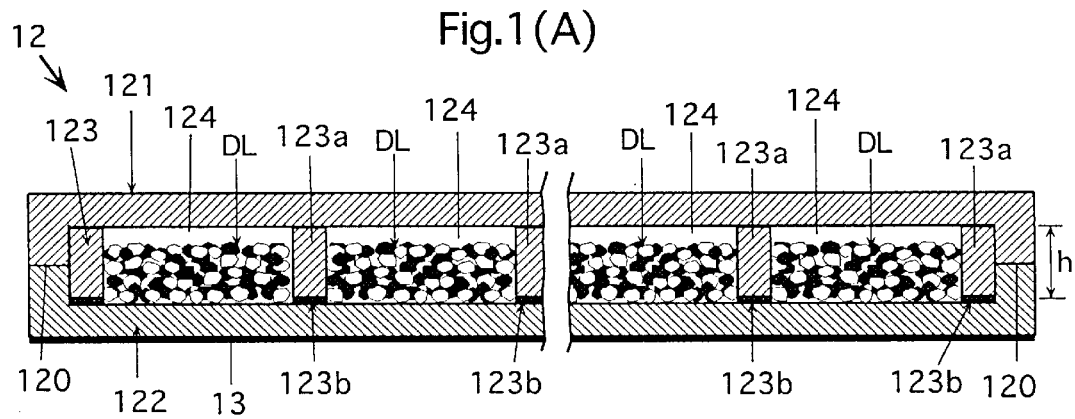
FIGS. 1(A) and 1(B) show an example of an image display medium of a dry chargeable particle containing type.

DESCRIPTION OF THE PREFERRED EMBODIMENTS (1) First Type of Image Forming Apparatus A first type of image forming apparatus of one of preferred embodiments of the invention includes a first image forming portion for forming an image on a normal image display medium, and a second image forming portion for forming an image on a reversible image display medium.

The first image forming portion for forming the image on the normal image display medium may be of an indirect recording type or a direct recording type.

As a typical example, the image forming portion of the indirect recording type may be of an electrophotographic type configured to form the image by forming an electrostatic latent image corresponding to the image to be formed on an electrostatic latent image carrier, developing the electrostatic latent image into a toner image and transferring the toner image onto the normal image display medium for fixing the same.

The image forming portion of the direct recording type may be of an ink-jet type configured to form the image by ejecting ink onto the image display medium in accordance with the image to be formed, may be of a sublimation transfer type configured to form the image by thermally transferring ink from a transfer film carrying sublimation ink onto the image display medium in accordance with the image to be formed, or may be of a thermal transfer type configured to form the image by thermally transferring thermal ink applied over transfer film onto the image display medium in accordance with the image to be formed.

The normal image display medium may be a normal paper sheet, an overhead projector sheet or the like as already described, and an appropriate image display medium can be used from among them in accordance with the method of forming the image on the normal image display medium by the first image forming portion.

The second image forming portion, for example, may be configured:

to display the image on the reversible image display medium of the electric field drive type by an electric field corresponding to the image to be formed, or to display the image on the reversible image display medium of the magnetic drive type by a magnetic field corresponding to the image to be formed.

The reversible image display mediums of the electric field drive type and the magnetic drive type will be described later. The image forming portion for the reversible image display medium will also be described later.

(2) Second Type of Image Forming Apparatus

A second type of image forming apparatus of one of preferred embodiments of the invention includes a first image forming portion for forming an image on a rewritable and reversible image display having at least an electrode among elements for driving an image display region to form the image, and a second image forming portion for forming the image on a reversible image display medium not having an electrode.

This type of image forming apparatus may have an image data storing portion for storing the image data. In this case, each of the first and second image forming portions may be configured to form the image based on the image data stored in the image data storing portion.

From the viewpoint of the drive type, the reversible image display may be of a matrix drive type having electrodes (e.g., individual electrodes for the respective pixels). In this case, a controller for applying a signal to the electrodes may be employed. The display may have an image storing property for storing and holding the written image even after stop of the application of the voltage to the electrode. In connection with control of the image writing, many respects can be common to the reversible image display of the matrix drive type and the other type of reversible image display medium, if the other type is the electric field drive type. Therefore, the image forming apparatus can be inexpensive.

The reversible image display may be releasably connected to a main body of the image forming apparatus provided that the display has the image storing property for storing the written image. This releasable structure improves the operability of the image forming apparatus.

From the viewpoint of the medium used for display, the reversible image display may be a panel display such as a liquid crystal display or an electro-luminescence display. Further, it may be a panel display such as a liquid crystal display, which has an image storing and holding property (image memory property) even after stop of application of the voltage to the electrode.

The second type of image forming apparatus can also employ the following reversible image display of the dry chargeable particle containing type, which is a modification of the reversible image display medium of the electric field drive type of the dry chargeable particle containing type usable in the fist type of image forming apparatus, and will be described later.

This reversible image display includes dry developer contained in developer containing cell(s), which is (are)

formed between two substrates (at least one having light transparency) opposed to each other with a predetermined gap therebetween. The dry developer contains at least two kinds of frictionally chargeable dry developer particles having different chargeable polarities and having different optical reflection densities (in other words, providing "different degrees of contrast" or "different colors"). The reversible image display is also provided with electrodes for image formation on each substrate. The electrode on one of the substrates may be formed of a group of independent electrodes for respective pixels.

According to this display with the electrodes, a predetermined electric field is formed across the electrodes for each of the pixels corresponding to the image to be displayed while at least two kinds of dry developer particles are frictionally charged to different polarities, respectively. Thereby, the developer particles charged to the respective polarities move in the opposite directions depending on the direction of the electric field within the medium so that an image having contrast is displayed.

From the above, the reversible image display may typically be selected from the following displays of the matrix drive type each having the electrodes for image formation as well as the signal application controller for the electrodes, i.e., a display panel such as a liquid crystal display, and particularly a display panel which has an image storing and holding property, and may be releasably connected to a main body of the image forming apparatus, and a reversible image display of the dry chargeable particle containing type described above, which may be releasably connected to the main body of the image forming apparatus.

The second image forming portion in the second type of image forming apparatus may be similar to the second image forming portion in the first type of image forming apparatus, and thus may be the image forming portion for displaying the image on the reversible image display medium of the electric field drive type by an electric field corresponding to the image to be formed, or displaying the image on the reversible image display medium of the magnetic drive type by the magnetic field corresponding to the image to be formed.

The reversible image display mediums of the electric field drive type and the magnetic drive type may be similar to those used in the first type of image forming apparatus, depending on the structure of the image forming portion.

(3) Third Type of Image Forming Apparatus

A third type of image forming apparatus of one of preferred embodiments of the invention includes:

an image data storing portion for storing image data sent thereto;

a draft image forming portion for forming an image on an image display medium in a draft mode;

a finish image forming portion for forming an image on an image display medium in a finish mode; and a draft image data forming portion for forming draft image data from the image data stored in the image data storing portion.

The draft image forming portion can form the image on the image display medium in accordance with the draft image data formed by the draft image data forming portion, and the finish image forming portion can form the image on the image display medium in accordance with the image data stored in the image data storing portion.

In the draft mode, as already described, the image formation is performed in the image state contributing to reduction in environmental loads relating to required resources, energies and others. For executing this draft mode, the draft image data forming portion forms the draft image data from the image data stored in the image data storing portion.

The draft image data differs from the image data stored in the image data storing portion, and is, for example, image data of a low resolution, monochrome image data (if the original data is color image data), image data of low-level gray scale, image data of a reduced image output area, image data for displaying data of multiple pages on one page, image data of reduced image density (e.g., image density of a solid portion) or a combination of at least two of them.

In connection with, e.g., the resolution, it is now assumed that the apparatus receives image data of 600 dpi from a personal computer. In this case, the data is temporarily stored in the image data storing portion, and the image data of 600 dpi is read out from the storing portion when the finish mode is selected. When the draft mode is selected, the image data of 600 dpi is converted into image data of, e.g., 100 dpi, and the image is displayed based on the converted data.

The draft image forming portion may be configured to form the image on the normal image display medium such as a normal sheet paper, but may be configured to form the image on the reversible image display medium of the rewritable (i.e., image-writable, image-erasable and image-rewritable) type for further reduction in required resources and energies.

The finish image forming portion may be configured to form the image on the normal image display medium such as a normal paper sheet, or may be configured to form the image on the reversible image display medium. However, for long-term preservation, presentations and others, the finish image forming portion may be configured to form the image on the normal image display medium such as a normal paper sheet.

In any one of the foregoing cases, the image forming portion forming the image on the normal image display medium such as a normal paper sheet may be selected from the image forming portions of various indirect recording types and various direct recording types already described in connection with the image forming apparatus of the first type.

The third type of image forming apparatus can be roughly classified into the following two type (3-1) and (3-2):

(3-1)

An image forming apparatus of type (3-1) is provided with a mode designating portion for selectively designating the draft mode and the finish mode. The draft image forming portion can form the image on the image display medium in accordance with the draft image data formed by the draft image data forming portion when the draft mode is designated by the mode designating portion. The finish image forming portion can form the image on the image display medium in accordance with the image data stored in the image data storing portion when the finish mode is designated by the mode designating portion.

This image forming apparatus may be provided with an image formation instructing portion (e.g., an image formation instructing key) for selectively instructing the draft image formation and the finish image formation, and the mode designating portion may include the image formation instructing portion. By the image formation instructing portion, the draft mode can be designated and the draft image formation can be instructed, and alternatively the finish mode can be designated and the finish image formation can be instructed.

An image display medium accommodating cassette attaching portions may be formed in a plurality of positions in the following manners.

A portion for attaching a finish image display medium accommodating cassette and a portion for attaching a draft image display medium accommodating cassette are employed, and a cassette designating portion (e.g., a cassette selecting and designating key) is employed. The mode designating portion may include the cassette designating portion. By the cassette designating portion, the draft mode and the draft image display medium accommodating cassette can be designated, or the finish mode and the finish image display medium accommodating cassette can be designated. In this case, the draft image forming portion may be formed of a portion of forming the image on the draft image display medium, and the finish image forming portion may be a portion of forming the image on the finish image display medium.

If the portion for attaching the image display medium accommodating cassette is only one in number, the following structure may be employed.

The structure is provided with an image display medium accommodating cassette attaching portion, and a medium type detecting device for detecting whether the image display medium in the cassette attached to the image display medium accommodating cassette attaching portion is the image display medium for finish mode or the image display medium for draft mode. This medium type detecting device may be included in the mode designating portion. In this case, the draft image forming portion may be likewise formed of a portion of forming the image on the draft image display medium, and the finish image forming portion may be a portion of forming the image on the finish image display medium.

In this image forming device, the cassette is attached to the attaching portion. When the medium type detecting device detects the finish image display medium, the finish mode is designated. When the draft image display medium is detected, the draft mode is designated.

The medium type detecting device may be as follows:

(a) A device for detecting whether the image display medium to be used for image formation is the finish image display medium or the draft image display medium, based on the medium type display portion arranged in the image display medium accommodated in the cassette attached to the cassette attaching portion provided in the image forming apparatus.

(b) A device for detecting whether the image display medium to be used for image formation is the finish image display medium or the draft image display medium, based on the medium type display portion arranged in the cassette attached to the cassette attaching portion provided in the image forming apparatus, and configured to display the type of the image display medium accommodated in the cassette.

(3-2)

An image forming apparatus of type (3-2) is provided with a finish mode designating portion for designating the finish mode. The finish image forming portion can form the image on the image display medium in accordance with the image data stored in the image data storing portion after the image formation on the image display medium by the draft image forming portion when the finish mode is designated by the finish mode designating portion.

This image forming apparatus may be provided with a finish image formation instructing portion (e.g., finish image formation instructing key), and the finish mode designating portion may include the finish image formation instructing portion. By the finish image formation instructing portion, the finish mode can be designated and the finish image formation can be instructed.

The image display medium accommodating cassette attaching portions may be formed in a plurality of positions in the following manners.

A portion for attaching a finish image display medium accommodating cassette and a portion for attaching a draft image display medium accommodating cassette are employed, and a cassette designating portion (e.g., a cassette selecting and designating key) is employed for designating the finish image display medium accommodating cassette.

The mode designating portion includes the cassette designating portion. By the cassette designating portion, the finish mode and the finish image display medium accommodating cassette can be designated. In this case, the draft image forming portion may be formed of a portion of forming the image on the draft image display medium, and the finish image forming portion may be a portion of forming the image on the finish image display medium.

If the portion for attaching the image display medium accommodating cassette is only one in number, the following structure may be employed.

The structure is provided with an image display medium accommodating cassette attaching portion, and a medium type detecting device for detecting whether the image display medium in the cassette attached to the one image display medium accommodating cassette attaching portion is the image display medium for finish mode or the image display medium for draft mode. The finish mode designating portion may include the medium type detecting device. The finish mode is designated when the medium type detecting device detects the finish image display medium. In this case, the draft image forming portion may be likewise formed of a portion of forming the image on the draft image display medium, and the finish image forming portion may be a portion of forming the image on the finish image display medium.

In the third type of image forming apparatus, as already described, the finish image display medium may be either the normal image display medium such as a normal paper sheet or the reversible image display medium. The draft image display medium may be either of them.

For example, the finish image display medium may be formed of the normal image display medium such as a normal paper sheet, and the draft image display medium may be formed of the rewritable reversible image display medium. In this case, the finish image forming portion may be likewise formed of a portion of forming the image on the normal image display medium, and the draft image forming portion may be a portion of forming the image on the reversible image display medium.

The finish image display medium may be formed of a normal image display medium such as a normal paper sheet, and the draft image display medium may also be formed of a normal image display medium such as a normal paper sheet having a lower quality than that for the finish image. In the case where the normal image display mediums are used for both the finish and draft images, an entire or major structure of the image forming portion for the finish image may be common to that of the image forming portion for the draft image. In the case where the reversible image display mediums are used for both the finish and draft images, an entire or major structure of the image forming portion for the finish image may also be common to that of the image forming portion for the draft image.

In the third type of image forming apparatus, the draft image forming portion may be formed of a device for forming the image on the reversible image display medium, in which case the draft image forming portion may be configured to form the image on the reversible image display medium of the electric field drive type by an electric field corresponding to the image to be formed.

The draft image forming portion may be configured to form the image on the reversible image display medium of the magnetic drive type by a magnetic field corresponding to the image to be formed.

These reversible image display mediums of the electric field drive type and the magnetic drive type may be similar to those used in the first type of image forming apparatus, depending on the structure of the image forming portion.

In the first to third types of image forming apparatuses, the reversible image display medium of the electric field drive type, which can be used depending on the structure of the image forming portion, may be an image display medium of a dry chargeable particle containing type, an electrophoresis type, a twist ball type or the like. These will now be described.

<Image Display Medium of Dry Chargeable Particle Containing Type>

A reversible image display medium includes dry developer particles contained in developer containing cell(s), which is(are) formed between two substrates (at least one having light transparency) opposed to each other with a predetermined gap therebetween. The dry developer contains two kinds of frictionally chargeable dry developer particles having different chargeable polarities and having different optical reflection densities (in other words, providing "different degrees of contrast" or "different colors").

According to the image display medium, an electric field corresponding to the image to be displayed is applied while at least two kinds of dry developer particles are frictionally charged to different polarities, respectively, and thereby the developer particles charged to the respective polarities move in the opposite directions depending on the direction of the electric field within the medium so that an image having contrast is displayed.

The medium of dry chargeable particle containing type may also be as follows:

This reversible image display medium also includes dry developer contained in developer containing cell(s), which is (are) formed between two substrates (at least one having light transparency) opposed to each other with a predetermined gap therebetween. The dry developer contains two kinds of frictionally chargeable dry developer particles having different chargeable polarities and having different optical reflection densities (in other words, providing "different degrees of contrast" or "different colors"). At least one kind of the developer particles are magnetic particles.

On this image display medium, the image can be displayed similarly to the foregoing image display medium of the dry chargeable particle containing type. Since at least one kind of the developer particles forming the dry developer are magnetic particles, the developer (developer particles) can be stirred with a magnetic field such as an oscillating magnetic field. This stirring of the developer promotes the movement of the developer particles in the operations of initialization of the medium, erasing (a kind of initialization) of the last image prior to the image formation (image display) and displaying the image in the electric field (electrostatic field) for image display. These can improve the image display.

When using the reversible image display medium of the dry chargeable particle containing type employing the foregoing magnetic particles, the image forming portion for forming the image thereon may be provided with a device for magnetically stirring the dry developer particles when forming the image by the electric field on the reversible image display medium.

The developer particles contained in the cell(s) may have a particle diameter in a range from about 1 $\mu$m to about 100 $\mu$m. The developer particles may be fine particles having such a structure that various kinds of coloring agent, charge control agent and others are dispersed in the binder resin. A third component (particles) such as a fluidity improving agent may be added and mixed.

<Image Display Medium of Electrophoresis Type>

In this medium, a closed space is formed between two substrates opposed to each other with a spacer therebetween, and is filled with display liquid formed of particles having electrophoretic mobility and a dispersion medium having a color different from that of the particles and containing the particles in a dispersed fashion. The image is displayed in the color of the particles or the dispersion medium by applying the electric field corresponding to the image to be displayed and thereby moving the particles in the display liquid.

The display liquid is generally formed of dispersion medium containing isoparaffin or the like, particles of, e.g., titanium dioxide, dye for providing contrast in color with respect to the particles, a dispersion agent such as a surface active agent and additives such as a charge applying agent.

<Image Display Medium of Twist Ball Type>

A typical example is a medium known as gyricon-base electronic paper display. This medium usually has a sheet-like form, and is disclosed in U.S. Pat. Nos. 4,126,854 and 4,143,103, although not restricted thereto. In the medium of twist ball type, two-color spherical members each having an outer surface formed of halves, which are different in color (e.g., white on one of the semi-spherical surfaces, and another color (e.g., black) on the other), are surrounded by liquid, wax or the like, and the spherical members thus surrounded fill cavities in an insulating property holding medium. By applying an external electric field corresponding to the image, the spherical members rotate within the cavities in accordance with their electrical anisotropy so that the image is displayed. The medium may be configured such that the image can be displayed by heating it to a temperature higher than the melting point of wax surrounding the spherical members and by applying an external electric field, and the image can be fixed by cooling it to a temperature not exceeding the wax melting point.

<Reversible Image Display Medium of Magnetic Drive Type>

In the first to third types of image forming apparatuses, the following reversible image display mediums of the magnetic drive type can be used depending on the structure of the image forming portion.

(a) An image display medium, in which dispersion liquid containing magnetic particles dispersed therein is held in cell(s) formed between two substrates opposed to each other with a predetermined gap therebetween, and the magnetic particles have an optical reflection density different from that of the dispersion liquid.

(b) An image display medium, in which a coating layer of micro-capsules filled with dispersion liquid containing magnetic particles dispersed therein is formed on one side of a substrate, and the magnetic particles in the micro-capsules have an optical reflection density different from that of the dispersion liquid.

Each of these reversible image display mediums allows image display (image writing), image erasing and rewriting of a written image by selecting the electric field or magnetic field, and thereby allows reuse. Accordingly, it is not necessary to abandon the medium which was once used for image display.

All the developer particles in the medium of the dry chargeable particle containing type, the particles or the like having the electrophoretic mobility and arranged in the electrophoretic medium, the spherical particles or the like in the medium of the twist ball type, and the magnetic particles or the like in the medium of the magnetic drive type are confined in the medium, and thus are not consumed. Further, external supply of the developer is not required. Therefore, it is possible to reduce significantly the use of consumable materials such as image display mediums (paper sheets), developer and ink required for image display in the prior art.

Further, each of the reversible image display mediums described above does not require operations such as heating and fixing of toner images, ejecting of ink and thermal transferring of an image from a transfer film in contrast to the conventional image formation on normal paper sheets or the like. This allows significant reduction in image forming energies (particularly, electric power), and allows fast image output.

Owing to the above, the running cost of the image forming apparatus can be low.

Accordingly, it is possible to satisfy current demands for reduction in environmental loads.

Further, each of the foregoing reversible image display mediums can be configured to allow image display with good contrast and high resolution.

Particularly, in the medium of the dry chargeable particle containing type, settling and cohesion of the developer particles are effectively suppressed because no liquid is present between the particles. Therefore, reduction in contrast can be suppressed, and the image display can be performed with stable contrast for a long term. Also, the resolution can be high. Since the image display is performed by applying a voltage to form the electric field while at least two kinds of the developer particles contained in the cell(s) are frictionally charged to have opposite polarities, the particles can move easily, and therefore the drive voltage for the image display can be low.

The first to third types of image forming apparatuses can employ the following image forming portions for the reversible image display mediums of the electric field drive type and the magnetic field drive type.

<Image Forming Portion for Reversible Image Display Medium of Electric Field Drive Type>

On the reversible image display medium of the electric field drive type, the image can be formed by applying the electric field (electrostatic field), which corresponds to the image to be formed, on the medium. Accordingly, the image forming portion for forming such an electric field (electrostatic field) can be configured to utilize an electrostatic latent image or to utilize a write electrode.

Image Forming Portion Utilizing Electrostatic Latent Image

This image forming portion is configured such that an electrostatic latent image corresponding to the image to be displayed is formed on one (e.g., the substrate on the image observation side) of the two substrates of the medium, or an externally formed electrostatic latent image is brought closer to the medium so that the electrostatic field is formed based on the electrostatic latent image.

The formation of the electrostatic field described above may be performed simultaneously with or after formation of the electrostatic latent image. The electrostatic field may be formed by applying a predetermined potential for formation of the electrostatic field on the substrate opposite to the substrate, on which the electrostatic latent image is to be formed or brought closer. Setting of the predetermined potential can be performed, e.g., by applying a bias to an opposite electrode, which is formed on in advance or is in contact with the opposite substrate, or by grounding the opposite electrode.

The electrostatic latent image may be formed directly on the medium surface (substrate surface), e.g., by a device for directly forming electrostatic latent image, or may be formed by transferring an external electrostatic latent image formed outside the medium by an external electrostatic latent image forming device on the medium surface (substrate surface). The external electrostatic latent image may be brought closer to the medium surface.

The direct electrostatic latent image forming device may be of various discharging types, which are configured to place electrostatic latent image charges by effecting discharging on the medium surface in accordance with the image to be displayed, and also may be of various charge supplying types, which are configured to place electrostatic latent image charges by injecting charges into the medium surface in accordance with the image to be displayed. As examples of the former, a device of an ion-flow type and a device of a multi-stylus type can be employed. The device of the multi-stylus type has an electrostatic record head, in which recording electrodes are arranged in a predetermined direction (e.g., in a main scanning direction for scanning the substrate with the device). As an example of the latter device, a device of a multi-stylus type can be employed, which has an electrostatic recording head, in which recording electrodes are arranged in a predetermined direction (e.g., in a main scanning direction for scanning the substrate with the device), and neighboring control electrodes neighbor to the recording electrodes.

The external electrostatic latent image forming device may be of such a type that an electrostatic latent image corresponding to the image to be displayed is formed on an electrostatic latent image carrier, and the electrostatic latent image on the electrostatic latent image carrier is transferred onto or brought closer to the surface of the medium substrate. More specifically, the electrostatic latent image corresponding to the image to be formed is formed, e.g., on a photoconductive member such as a photosensitive member, and the electrostatic latent image on the photoconductive member is transferred onto or brought closer to the surface of the medium substrate. Alternatively, the electrostatic latent image corresponding to the image to be formed may be formed on a dielectric member, and the electrostatic latent image on the dielectric member may be transferred onto or brought closer to the surface of the medium substrate.

The above external electrostatic latent image forming devices, and particularly the device of forming the electrostatic latent image on the photoconductive member such as a photosensitive member can achieve such an advantage that the photoconductive member and others can be formed of common parts if the image forming portion for the normal image display medium is of the electrophotographic type and employs the photoconductive member such as a photosensitive member.

Image Forming Portion Utilizing Write Electrode

The image forming portion has an image write electrode arranged in contact with or close to the substrate of the image display medium, and applies a bias corresponding to the image to be displayed to the electrode.

For example, the image forming portion may have individual electrodes for respective pixels arranged in contact with or close to one (e.g., the substrate on the image observation side) of the substrates of the image display medium, and opposite electrodes arranged in contact with or close to the other substrate, and may be configured to apply a bias corresponding to the image to be displayed to each of the individual electrodes.

<Image Forming Portion for Reversible Image Display Medium of Magnetic Drive Type>

This image forming portion may have a magnetic head for image writing.

In either of the case where the image forming portion forms the image on the reversible image display medium of the electric field drive type and the case where it forms the image on the reversible image display medium of the magnetic drive type, an image erasing device may be employed for initializing the medium, or performing, as a kind of initialization, erasing of the last displayed image before the image display. A developer stirring device may be employed for initializing the medium, erasing the last displayed image before the image display, or improving the flowability of the developer particles (particularly, improving the flowability of the developer particles in the medium in the case of the dry chargeable particle containing type) for image display. Both the image erasing device and the developer stirring device may be employed.

The image erasing device may be, e.g., an erase electric field forming device for forming an electric field moving the developer particles forming the developer in the image display medium, a stirring device for applying a stirring force to the developer or a device including both of these devices. Application of the stirring force can be performed, e.g., by forming an alternating electric field with respect to the developer, forming an oscillating magnetic field, emitting ultrasonic waves, applying mechanical vibrations or a combination of two or more of them.

The erase electric field forming device may be a device for forming the electric field such that one of the two kinds of developer particles of the same optical reflection density (in other words, the same degree of contrast or the same color) are collected toward one of the substrates, and the other kind of developer particles of the same optical reflection density are collected toward the other substrate. According to this device, initialization of the medium as well as the image erasing can be performed, and further movement of the developer particles is required only in the image portion when forming a new image so that the image display can be performed smoothly and reliably with a high quality.

The erase electric field forming device may include a pair of electrodes or dielectric members arranged on the opposite sides of the reversible image display medium as well as a power supply device for applying a bias voltage thereto.

In addition to the above, the erase electric field forming device may be an electric field forming device of the discharging type for forming an electric field by performing discharging to the image display medium, or an electric field forming device of a charge injecting type for forming the electric field by injecting charges into the image display medium. A corona charging device, an electric field forming device of an ion-flow type and an electric field forming device of a multi-stylus type having a head, in which electrodes are arranged in a predetermined direction, are examples of the former. An electric field forming device of a multi-stylus type having a head, in which electrodes are arranged in a predetermined direction, and neighboring control electrodes are arranged adjacently to the above electrodes, is an example of the latter.

The stirring device may have the following structure.

(1) Device of Forming Alternating Electric Field for Reversible Image Display Medium This device can be utilized in the case where at least one kind of developer particles has an insulating property.

(2) Device of Forming Oscillating Magnetic Field for Reversible Image Display Medium This device can be utilized in the case where at least one kind of the developer particles contain magnetic members.

(3) Device of Emitting Ultrasonic Waves to Reversible Image Display Medium (4) Device of Applying Mechanical Vibrations to Reversible Image Display Medium (5) Device Formed of a Combination of Two or More of the Above Devices.

Among them, the alternating electric field forming device and the oscillating magnetic field forming device are especially effective.

In the first type of image forming apparatus, the first image forming portion for the normal image display medium and the second image forming portion for the reversible image display medium may be independent of each other, or may be partially common to each other. However, the heads for writing the image on the image display medium may be preferably independent of each other for each control of the heads.

In any one of the image forming apparatuses of the foregoing types, the image forming portion for the reversible image display medium may be configured to allow printing of information such as a number of times of use of the medium, a degree of deterioration of the medium and performance information of the medium so that the apparatus can notify an user of, e.g., a life-time of the reversible image display medium.

The above information may be printed text (characters, numbers or the like). Alternatively, it may be a code (bar code, two-dimensional code or the like).

Examples of the image forming apparatus will now be described with reference to the drawings.

First, description will be given on the reversible image display medium.

<Reversible Image Display Medium of Dry Chargeable Particle Containing Type>

Figure 1B:
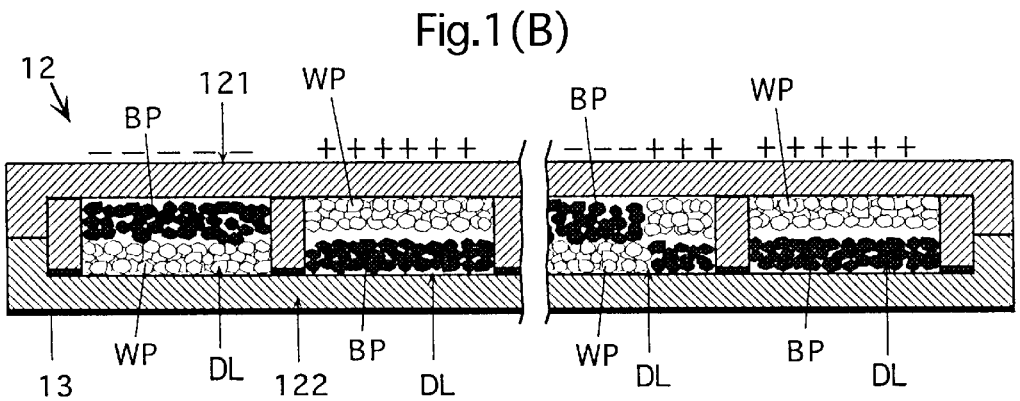
Figure 2:
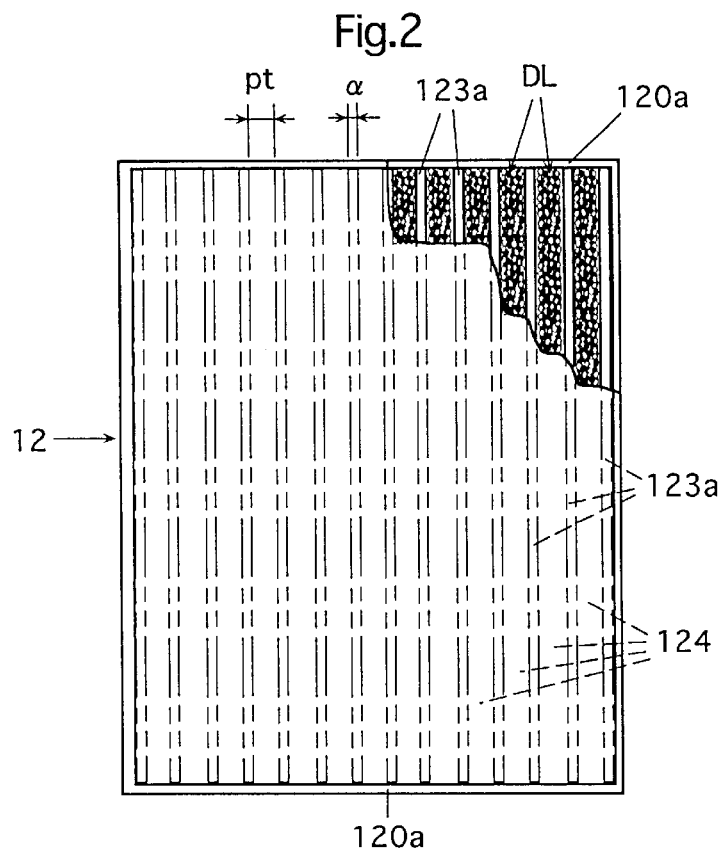
FIG. 2 is a plan showing the image display medium shown in FIG. 1(A) with a certain part cut away.

FIGS. 1(A), 1(B) and 2 show an example of a reversible image display medium of the dry chargeable particle containing type. FIG. 1(A) is a cross section of a reversible image display medium 12 before image display, and FIG. 1(B) is a cross section showing an example during the image display. FIG. 2 is a plan showing the medium 12 with a certain part cut away.

The image display medium 12 shown in these figures has a rectangular configuration, and includes first and second substrates 121 and 122 as well as a partition 123 located between these substrates. The first substrate 121 and the partition 123 are integral with each other, and are formed by thermal molding of transparent polyethylene terephthalate (PET). The second substrate 122 is also made of transparent PET, and has an outer surface coated with a vapor-deposited aluminum layer 13.

The partition 123 is formed of a plurality of longitudinal wall portions 123a, which are parallel to the longer side of the medium 12, and a developer accommodating cell 124 is formed by the neighboring wall portions 123a. Each cell 124 accommodates developer DL containing white and black developer particles WP and BP, which are mutually and frictionally charged.

The medium 12 is provided at its periphery with a thermally sealed portion 120 formed between the substrates 121 and 122. The seal portion 120 has portions 120a, which continue to the opposite ends of the longitudinal wall portions 123a and closes the opposite ends of the cells. These portions 120a also serve as partitions defining the cells 124.

Each cell is sealed so that developer DL does not leak from the cell.

The partition 123 (wall portions 123a) serves also as a spacer keeping a predetermined gap between the substrates 121 and 122.

The substrate 121 has an average thickness of 25 μm, and the substrate 122 likewise has a thickness of 25 μm. Each wall portion 123a has a width α of 20 μm and a height h of 100 μm, and is spaced from the neighboring wall portion by a distance pt of 200 μm. The developer DL is arranged within each cell 124 to fill 90% of its height before bonding the substrates together, and then a thin layer of photo-setting adhesive 123b is applied over top surfaces of the longitudinal walls 123a on the substrate 121. The substrate 122 is closely attached thereto, and ultraviolet light is emitted for curing the adhesive. Further, the peripheries of the substrates are thermally sealed.

The developer particles and the developer in the cell are specifically as follows.

White Developer Particles WP

Thermoplastic polyester resin (softening point=121° C., glass transition point=67° C.) in an amount of 100 parts by weight, titanium oxide (manufactured by Ishihara Sangyo Co., Ltd., CR-50) in an amount of 40 parts by weight, and salicylic acid-zinc complex (minus-charge-controlling agent Bontron E-84, manufactured by Orient Chemical Co., Ltd.,) in an amount of 5 parts by weight were fully mixed by a Henschel mixer. The mixture thus prepared was kneaded by a 2-shaft extruder/kneader, and thereafter was cooled. Thereafter, the mixture was roughly pulverized, and then was finely pulverized by a jet mill. The resulting powder was classified with wind to produce white fine-grained powder having a volume average particle diameter of 10.1 μm. Thereafter, 0.3 parts by weight of hydrophobic silica particles (Nihon Aerosil Co., Ltd.: Aerosil R-972) is added to the above powder, and the mixing and kneading are performed by a Henschel mixer to produce the white developer particles WP.

Black Developer Particles BP

Styrene-n-butyl-methacrylate resin (softening point=132° C., glass transition point=65° C.) in an amount of 100 weight parts, carbon black (Lion Oil & Fat Co., LTD., Kechenblack EC) in an amount of 4 parts by weight, silica (Nihon Aerosil Co., Ltd.: #200) in an amount of 1.5 parts by weight and magnetite-containing magnetic powder (manufactured by Titan Kogyo Co., LTD., RB-BL) in an amount of 500 parts by weight were fully mixed by a Henschel mixer, and then were kneaded by a kneader and then cooled.

Thereafter, the mixture was roughly pulverized by a feather mill, and then was finely pulverized by a jet mill. The resulting powder was classified with wind to produce black particles BP having a volume average particle diameter of 25 μm.

Developer DL

The white particles WP and the black particles BP were put into a polyethylene bottle at a rate of 12 grams of the white particles and 88 grams of the black particles. The bottle was rotated by a ball mill pedestal to knead and mix the contents for 30 minutes so that the developer DL was obtained. The white particles were charged negatively, and the black particles were charged positively. The developer thus prepared was used.

The above medium 12 used in the embodiments will be referred to as "medium TP1" hereinafter.

<Reversible Image Display Medium of Electrophoresis Type>

FIG. 3 shows an example of a structure of a reversible image display medium 14 of an electrophoresis type.

The medium 14 shown in FIG. 3 includes an electric field coloring layer 140 carried on a transparent carrier substrate 146. The electric field coloring layer 140 is formed of developer liquid 143, which includes charged and colored particles 141 dispersed in insulating liquid 142, and is sealingly held between a transparent conductive layer 144 and an insulating layer 145. The insulating liquid 142 is a mixture of high-purity petroleum (e.g., Isoper manufactured by Exxon Chemical Co., LTD.) as well as an ionic surface active agent and dyes. The organic particles 141 are mixed in the liquid 142 to complete the developer 143. The ionic surface active agent is adhered onto the organic colored particles 141 containing the pigment so that the particles are charged electrochemically stably. The charged and colored particles 141 are dispersed in the liquid 142 to exhibit an electrophoretic mobility.

When an electric field is not applied to the medium 14, or an electric field opposite to the predetermined electric field is applied to the medium 14, the dyes in the insulating liquid 142 can be externally viewed. When the electrostatic latent image is written, the charged and colored particles 141 move toward the transparent conductive layer 144 so that the colored particles can be externally viewed.

The image is displayed on the medium 14 by forming the electrostatic field corresponding to the image to be displayed with respect to the charged developer particles (charged and colored particles in this example) 14 dispersed in the insulating liquid 142.

Although the example of the structure has been described, the reversible image display medium of the electrophoresis type used in the embodiments is the medium TP2, which is the image display medium 12 shown in FIGS. 1 and 2 in which the developer DL is replaced with the developer 143. The developer 143 includes the charged and colored particles 141 dispersed in the insulating liquid 142, and fills each cell.

Filling each cell with the developer liquid 143 is performed in such a manner that the first and second substrates are bonded together except for a liquid inlet, and the developer liquid 143 is supplied through the inlet into each cell while preventing mixing of air bubbles, and then the heat seal is effected on the inlet.

The developer liquid in each cell of the medium TP2 is specifically as follows:

Black dye (manufactured by BASF AG, Sudan Black X60) in an amount 1 gram was mixed and sufficiently dissolved in 100 ml of isoparaffin hydrocarbon (Isoper G, Exxon Chemical Co., Ltd.) to obtain colored liquid.

To the liquid were added 10 grams of titanium dioxide particles (Ishihara Sangyo Co., Ltd., CR-50) and 70 grams of IP Solvent 1620 solution (manufactured by Idemitsu Petrochemical Co., LTD.) containing 0.5 wt % of Sulfol Ba-30N (Matsumura Oil Research Corp., barium sulfonate). The mixture was subjected to wet grinding treatment in ⅛ GL vessel equipped with a water jacket at cooling temperature of 20° C. and disc revolution of 2000 rpm for 15 hours with use of a sand grinder (Igarashi Kikai Seizo Co., Ltd.) and glass beads of 1 mm diameter as media (150 cc).

The resulting liquid developer having a high concentration (100 parts by weight) was diluted with an addition of 900 parts by weight of IP Solvent 1620, and was subjected to dispersion treatment at 10000 rpm for 5 minutes with use of T.K. Autohomomixer M-type (Tokushu Kika Kogyo Co., Ltd.) to obtain developing liquid used as the developer liquid 143.

The image display medium of the electrophoresis type of this specific example, which may be used in the embodiments, will be referred to as "medium TP2" hereinafter.

<Reversible Image Display Medium of Twist Ball Type>

FIG. 4 shows an example of a structure of a reversible image display medium 15 of the twist ball type.

The medium 15 shown in FIG. 4 has an electric field coloring layer 150 carried on a transparent carrier substrate 156. The electric field coloring layer 150 includes one-side colored balls 151 each having a colored portion 151a on one side. The balls 151 are surrounded by insulating liquid 152, and are buried together with the liquid 152 in an insulation holding medium material 153. A transparent conductive layer 154 and an insulating layer 155 are formed on the opposite sides of the medium material 153, respectively.

The one-side colored ball 151 is prepared, e.g., in such a manner that white balls of glass primarily made of $TiO_2$ are uniformly arranged on an appropriate table, and chrome or the like is vapor-deposited thereto. The ball 151 may have a size from 30 $\mu$m to 100 $\mu$m. If it is equal to or smaller than 10 $\mu$m, the resolution of the image is further improved.

The one-side colored balls 151 are dispersed in the insulation holding medium material 153 such as elastomer, and the medium material 153 is swelled by immersing it in a solution prepared by dissolving an ionic surface active agent in organic solvent such as toluene. Thereby, the insulating liquid 152 is kept around the one-side colored ball 151. In this manner, the one-side colored ball 151 is surrounded by the insulating liquid layer 152, and is rotatably buried together with the liquid in the insulation holding medium material 153.

The one-side colored ball 151 has one and the other halves, which are different in properties, and therefore are different in amount of absorbable ions. By applying the electric field to the medium 15, the direction of the colored and uncolored surfaces of the one-side colored particle 151 changes depending on the direction of the electric field. Accordingly, the image is displayed by selectively and externally exhibiting the colored and uncolored surfaces of the one-side colored ball 151.

Although an example of the structure has been described, the reversible image display medium of the twist ball type used in the embodiments is manufactured through the following steps. The reversible image display medium of the twist ball type, which may be used in the embodiments and is manufactured through the following steps, will be referred to as "medium TP3" hereinafter.

The medium TP3 employs two-color balls of 17 $\mu$m in particle diameter. One of hemispherical halves of its surface is coated with poly (trifluoroethyl methacrylate) and exhibits a white color. The other is blue. The resin used in this example for forming the ball is a polyester resin. A white pigment is titanium dioxide, and a blue pigment is copper phthalocyanine.

First Step: Preparation of Fully White Balls

Fifty grams of sulfonated polyester resin, copolymer of propylene-diethylene-terephthalate and propylene-diethylene-5-sulfoisophthalate were dispersed in 250 grams of water at 60° C. The polyester emulsion thus prepared was then cooled to a room temperature of about 25° C., and 10 grams of aqueous titanium dioxide dispersion (solid rate 50%), which was available from Sun Chemicals Company, was added to the emulsion thus cooled. Aqueous solution of 1 wt. % magnesium chloride (50 ml) was slowly added to the mixture thus prepared, and was uniformly mixed at about 1000 rpm. Thereafter, the mixture was moved into a kettle of one liter. The mixture thus prepared was stirred at 200 rpm and was heated to 55° C. for one night (about 18 hours). In this manner, 50 grams of white mono-color balls, which had a ball diameter 17 $\mu$m measured by a Coulter counter and a geometric size distribution of 1.13, were obtained.

Second Step

In the second step, 0.25 grams of ammonium cerium nitrate and 1 milliliter of 1 N nitric acid solution were added to 10 grams of white mono-color balls in 100 grams of surface polymerization water. The mixture thus prepared was stirred for 3 hours. Thereafter, the white balls were filtered off, and then were suspended again in 100 milliliters of water. Then, 0.25 grams of potassium persulfate, 0.25 grams of sodium hyposulfite and 0.5 grams of trifluoroethyl acrylate were added thereto. The mixture thus prepared was stirred at a room temperature (about 25° C.) for 3 hours, and the surface grafted mono-color balls thus prepared were filtered off, were rinsed with water and were suspended again in about 1 liter of water.

Third Step: Thermal Vapor-Deposition Coating Using Copper Phthalocyanine of Balls on Glass Using the liquid in which the mono-color chargeable white balls were suspended, a coating layer smaller than about 500 nanometers in thickness (about 400 nanometers in this example) was formed on a glass slide substrate by the Langmuir projet technique. This coating layer was dried in air for about 18 hours. Onto this dry white balls, copper phthalocyanine pigment was vapor-deposited in a vacuum atmosphere of about 0.0001 mmHg about 0.1 mmHg.

In this manner, the two-color balls of white and blue were obtained. In the two-color ball, the rate of the blue portion was substantially equal to that of the white portion. The phthalocyanine layer of 0.3 $\mu$m in thickness hardly affected the diameter of the ball, and the two-color balls thus obtained had the unchanged diameter of about 17 $\mu$m. In this medium, the white side of the ball processed with fluoroacrylate and the side coated in blue with the copper phthalocyanine were charged to have different polarities, respectively.

Fourth Step: Manufacturing of Image Display Medium

Fifty grams of the two-color balls thus prepared through the above steps were mixed with 50 grams of Sylgard (registered trademark) 185 silicone elastomer kit, which was available from Dow Corning Corp.

A measuring bar such as 8-path wet film coating device, which was available from P. Gardner Company, and had a gap of about 20 $\mu$m to about 500 $\mu$m, was used to spread the foregoing mixture over the glass plate surface to form a sheet. The sheet thus formed was heated at a temperature from about 80° C. to about 100° C. for about 3 hours to about 24 hours and thus the SYLGARD elastomer sheet was cross-linked.

Then, the sheet was immersed in appropriate oil such as Isoper or silicone oil of about 50-about 500 milliliters within a container so that the sheet was plasticized, and oil filling holes were formed in the sheet.

Further, the sheet was removed from the oil container, and was sealingly held between Mylar substrates of about 15 $\mu$m in thickness. One of the Mylar substrates (the substrate on the rear side) was provided in advance with a conductive layer (e.g., coated with vapor-deposited layer of aluminum).

In this manner, the reversible image display medium (TP3) of the twist ball type was obtained.

<Reversible Image Display Medium of Magnetic Drive Type>

FIG. 5 shows by way of example a structure of a reversible image display medium 16 of the magnetic drive type.

The medium 16 shown in FIG. 5 includes light absorbing black magnetic particles 164 and plastic dispersion 165, which contains a dispersion medium, and also contains, if desired, a thickner and a coloring agent. These particles 164 and the dispersion 165 are confined in each of small chambers 163 of the multi-cell structure sheet 160, which are formed by partitioning a space between two substrates 161 and 162. At least one of the two substrates 161 and 162 is transparent.

Instead of the medium of the above structure, the image display medium may have such a structure that the light absorbing black magnetic particles 164 and the plastic dispersion 165 similar to the above are confined in many micro-capsules, and a coating layer of these many micro-capsules is formed on one side of the transparent substrate.

According to these image display mediums, as shown in FIG. 5, a magnetic head H2 is used on the substrate surface of the substrate 161 on the front side (image observation side) to form predetermined magnetic fields for the respective pixels in accordance with the image to be formed. Thereby, magnetic particles 164 are attracted and moved by the magnetic force so that the image is displayed owing to contrast and difference in color between the plastic dispersion 165 and the magnetic particles 164.

The writing magnetic head H2 may have such a structure that includes a group of electromagnets 171, which are arranged for magnetically attracting the magnetic particles 164 within chambers 163 (or micro-capsules in the medium of the micro-capsule type) of the medium 16, toward the front substrate 161, and also includes a DC power source 172 for supplying a DC current to each electromagnet 171.

A coloring agent of the plastic dispersion 165 may be a white pigment or other pigments or dyes. The coloring agent may be added in amount of 10% or less, and preferably 3% or less to the plastic dispersion so that the contrast between the plastic dispersion liquid 165 and the magnetic particles 164 can be increased for clear image display.

The liquid absorbing black magnetic particles 164 are preferably made of magnetic material such as magnetite, ferrite or the like as well as a coloring agent such as carbon black and binder resin, which are kneaded and pulverized into particles having a particle diameter of about 5 $\mu$m-about 100 $\mu$m.

The light absorbing black magnetic particles 164 are added to the plastic dispersion 165 in amount of 5%–30% by weight, and more preferably, of 10%–20% by weight.

The dispersion medium forming the plastic dispersion 165 may be preferably isoparaffin solvent such as Isoper (manufactured by Exxon Chemical Co., Ltd.), a silicone oil or the like.

The reversible image display medium of the magnetic drive type used in the embodiments may be formed through the following steps. The reversible image display medium of the magnetic drive type, which may be used in the embodiments and is manufactured through the following steps, will be referred to as "medium TP4" hereinafter.

First Step: Manufacturing of Plastic Dispersion

In this step, 2.5 parts by weight of Bisamide KH (methylene-bis-12-hydroxy-stearic acid amide manufactured by Nippon Kasei Kabushiki Kaisha) was added to 80.8 parts by weight of Isoper M (isoparaffin solvent manufactured by Exxon Chemical Co., Ltd.), and was dissolved by heating them. After cooling the mixture, the dispersion liquid of Bisamide KH was obtained.

This dispersion (82.5 parts by weight) and 1 part by weight of Tipaque CR-50 (titanium dioxide manufactured by Ishihara Sangyo Co., Ltd.) were mixed by the T.K. homomixer (wet dispersing device manufactured by Tokushu Kika Kogyo Co., Ltd.) to produce 83.5 parts by weight of white dispersion.

Thermoplastic polyester resin (softening point=121° C., glass transition point=67° C.) in an amount of 100 parts by weight, carbon black (Lion Oil & Fat Co., LTD., Kechenblack EC) in an amount of 4 parts by weight, silica (Nihon Aerosil Co., Ltd.: #200) in an amount of 1.5 parts by weight and magnetite-containing magnetic powder (manufactured by Titan Kogyo Corp., RB-BL) in an amount of 500 parts by weight were fully mixed by a Henschel mixer, and then were kneaded by a kneader and then cooled.

Thereafter, the mixture was roughly pulverized by a feather mill, and then was finely pulverized by a jet mill. The resulting powder was classified with wind to produce black particles having a volume average particle diameter of 25 $\mu$m.

Then, this black magnetic particles were mixed with the white dispersion liquid at a rate of 16.5 parts by weight and 83.5 parts by weight to produce the plastic dispersion of 100 parts by weight.

Second Step: Manufacturing of Medium of Magnetic Drive Type

First, a polyvinyl chloride sheet of about 100 $\mu$m in thickness was used as the transparent substrate on the front side (image observation side). This step also used a multi-cell plate. This plate was about 25 $\mu$m in thickness, was made of polyvinyl chloride and had a honey-comb structure having substantially hexagonal cells, each of which had a side of about 2 mm and a height of about 300 $\mu$m. The multi-cell plate was adhered to the polyvinyl chloride sheet with an ethylene-vinyl acetate type adhesive to provide multi-cell (multi-chamber) structure. Then, each cell (each small chamber) of the multi-cell structure was filled with the plastic dispersion. A transparent polyvinyl chloride sheet of about 100 $\mu$m was used as the substrate on the rear side, and was bonded to the multi-cell plate with an epoxy adhesive so that each cell was sealed, and the medium of the magnetic drive type TP4 is manufactured.

Several examples of the image forming apparatus will now be described. In the following description:

the normal image display medium such as a normal paper sheet may be referred to as "medium PP", and the reversible image display medium may be referred to as "medium TP".

The reversible image display mediums of the electric field drive type and the magnetic drive type used in the following examples are the same as those already described.

The reversible image display medium of the dry chargeable particle containing type may be referred to as "medium TP1".

The reversible image display medium of the electrophoresis type may be referred to as "medium TP2".

The reversible image display medium of the twist ball type may be referred to as "medium TP3".

The reversible image display medium of the magnetic drive type may be referred to as "medium TP4".

The image formation mode for the normal image display medium such as normal paper may be referred to as a "PP mode", and the image formation mode for the reversible image display medium may be referred to as a "TP mode".

First, examples of the first type of image forming apparatus will be now described with reference to FIGS. 6–13.

Figure 6:
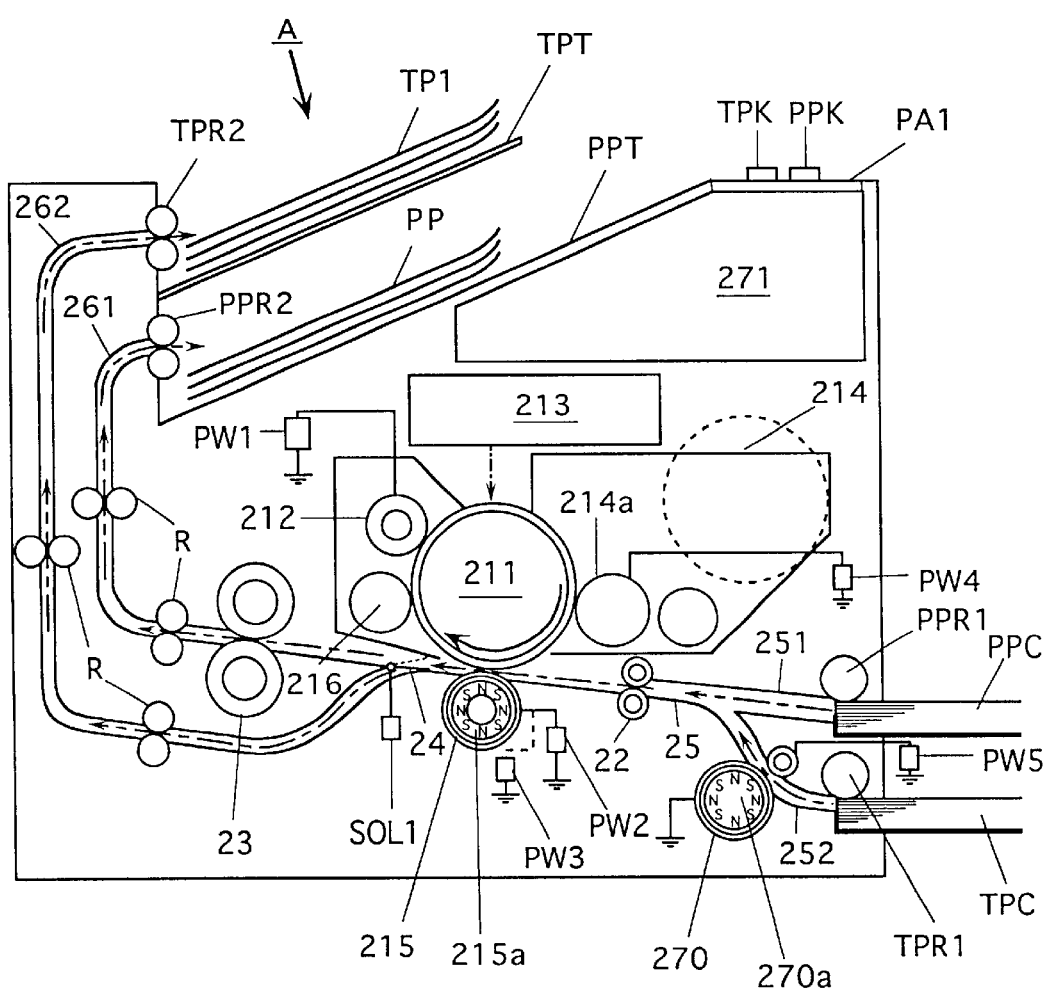
FIG. 6 shows a schematic structure of an example of the image forming apparatus.

<Image Forming Apparatus A in FIG. 6>

An image forming apparatus A in FIG. 6 has a drum-type photosensitive member 211, and also includes a charger (charging roller in this example) 212, an image exposing device 213, a developing device 214, a transfer device (transfer roller in this example) 215 and a cleaner (cleaning roller in this example) 216.

The developing device 214 has a developing roller 214a, and accommodates positively chargeable toner. The transfer roller 215 is internally provided with a magnet roller 215a to be driven to rotate.

The photosensitive member 211 is driven to rotate clockwise in the figure by a drive device (not shown). The charging roller 212, developing roller 214a, cleaning roller 216, transfer roller 215 and magnet roller 215a are driven to rotate in predetermined directions, respectively.

A power source PW1 can applies a voltage to the charging roller 212 for charging the photosensitive member. The transfer roller 215 can be selectively connected to power sources PW2 and PW3 in accordance with an instruction sent from a controller 271, which will be described later. The transfer roller 212 can receive from the power source PW2 a transfer voltage for transferring a toner image on the photosensitive member to the medium PP, and can also receive from the power source PW3 a bias voltage for forming an image on the medium TP. The developing roller 214a is supplied with a developing bias from a power source PW4.

The apparatus A further includes a timing roller pair 22 located upstream to a nip between the photosensitive member 211 and the transfer roller 215, and further includes a removable cassette PPC accommodating the medium PP and a removable cassette TPC accommodating the medium TP, which are located upstream to the roller pair 22.

The cassette PPC is opposed to a feed roller PPR1 for feeding or pulling out the mediums PP one by one, and the cassette TPC is opposed to a roller TPR1 for feeding or pulling out the mediums TP one by one.

The medium PP which is pulled out from the cassette PPC moves through a path 251 for medium PP into a common path 25, and can reach the timing roller pair 22.

The medium TP which is pulled out from cassette TPC moves through a path 252 for medium TP into the common path 25, and can reach the timing roller pair 22.

An eraser roller pair 270, which is driven to rotate for medium TP, is opposed to the path 252 for medium TP. One of the rollers of the eraser roller pair 270 (upper roller in this example) can be supplied with a bias for image erasing from a power source PW5. The other roller (lower roller in this example) is grounded. At least one of the rollers of the roller pair 270 (lower roller in this example) is internally provided with a magnet roller 270a to be driven to rotate.

The apparatus A further includes a switching member 24, which is located downstream to the nip between the photosensitive member 211 and the transfer roller 215, and is driven by a solenoid SOL1 for switching the medium transporting path.

From the member 24, a transportation path 261 for medium PP extends through the fixing roller pair 23 and a discharge roller pair PPR2 to a discharge tray PPT, and another transportation path 262 for medium TP also extends through the discharge roller pair TPR2 to the discharge tray TPT. The transportation paths 261 and 262 are provided at appropriate positions with medium guide roller pairs R.

Above the image exposing device 213, the controller 271 for controlling the operation of the whole apparatus is arranged, and is connected to a control panel PA1.

The control panel PA1 is provided with keys such as a key PPK for designating the medium PP and instructing start of the image formation thereon as well as a key TPK for designating the medium TP and instructing start of the image formation thereon.

When the key PPK is depressed, the medium feed roller PPR1 opposed to the cassette PPC, the timing roller pair 22, the photosensitive member 211, the charging roller 212 connected to the power source PW1, the image exposing device 213, the developing roller 214a, the transfer roller 215 connected to the power source PW2, the fixing roller pair 23 and the discharge roller pair PPR2 operate in accordance with predetermined timing under control of the controller 271 so that the image is formed on the medium PP in the PP mode, and then the medium PP is discharged onto the tray PPT. In this PP mode, the switching member 24 is positioned to guide the medium PP to the medium transporting path 261 in accordance with the instruction sent from the controller 271. These form the image forming portion for the medium PP.

When the key TPK is depressed, the medium feed roller TPR1 opposed to the cassette TPC, the eraser roller pair 270 connected to the power source PW5, the magnet roller 270a, the timing roller pair 22, the photosensitive member 211, the charging roller 212 connected to the power source PW1, the image exposing device 213, the transfer roller 215 supplied with the image writing bias voltage from the power source PW3 and the discharge roller pair TPR2 operate in accordance with predetermined timing under control of the controller 271 so that the image is formed on the medium TP in the TP mode, and the medium TP is discharged onto the tray TPT. In this TP mode, the switching member 24 is positioned to guide the medium TP to the medium transporting path 262 in accordance with the instruction from the controller 271. These form the image forming portion for the medium TP.

The image formation on the normal paper by the image forming apparatus A in the PP mode as well as the image formation on the medium TP1 in the TP mode will now be described further in greater detail.

PP Mode (Image Formation on the Normal Paper by the Electrophotographic Method)

In FIG. 6, the medium PP (normal paper sheets) accommodated in the cassette PPC is pulled out from the cassette PPC by the feed roller PPR1, and is transported to the timing roller pair 22 so that it comes into contact with the nip portion of the roller pair 22. In this operation, a fore-regist sensor (not shown) detects the leading end of the medium PP to determine the timing for transferring of the toner image on the photosensitive member with respect to the medium PP.

The surface of the photosensitive member 211 is charged by the charging roller 212 to +500 V, and the image exposing device 213 performs the image exposure on the charged region so that an electrostatic latent image corresponding to the intended image is formed. The surface potential on the exposed portion is reduced to about 0 V, and the portion other than the above is kept at +500 V.

This electrostatic latent image reaches the developing device 214, and the developing roller 214a thereof is supplied with the developing bias of +400 V from the power source PW4.

Accordingly, the electrostatic latent image on the photosensitive member 211 is developed into a visible image with the toner by the electric field formed between the electrostatic latent image and the developing roller 214a. Thus, only the exposed portion is developed with the toner.

Then, the transfer roller 215 transfers the toner image formed on the photosensitive member onto the medium PP, which is sent in synchronization with the toner image on the photosensitive member by the timing roller pair 22. In this operation, the transfer roller 215 is supplied with a bias of −1000 V so that the positively chargeable toner is electrostatically transferred onto the medium PP from the photosensitive member.

Thereafter, the photosensitive member 211 is cleaned up by the cleaning roller 216 to remove the untransferred residual toner on the photosensitive member, and then the surface potential thereof is initialized by the charging roller 212 for the next image forming operation.

The transferred toner image on the medium PP is fixed onto the medium PP by the pressure and heat, which are applied to the toner image when passing through the fixing roller pair 23, and then is discharged onto the tray PPT.

TP Mode (Using Medium TP1)

In FIG. 6, the medium TP1 accommodated in the cassette TPC is pulled out from the cassette TPC by the feed roller TPR1, and is transported to the timing roller pair 22 through the eraser roller pair 270 so that it comes into contact with the nip portion of the roller pair 22. In this operation, the fore-regist sensor (not shown) detects the leading end of the medium TP1 to determine the timing for writing the image onto the medium TP1.

The eraser roller pair 270 carrying the bias voltage of +250 V supplied from the power source PW5 moves the white developer particles in the medium TP1 toward one of the substrates, and also moves the black developer particles toward the other substrate so that the medium TP1 is initialized (and the image, if already formed, is erased). Further, the rotating magnet roller 270a applies an oscillating magnetic field to the developer containing the magnetic particles contained in the medium TP1 for stirring it so that the flowability of the developer particles is improved to achieve easy initialization of the medium TP1.

The eraser roller pair 270 may be arranged on either upstream to or downstream from the timing roller pair 22. One roller pair may be configured to serve both the eraser roller pair and the timing roller pair.

The surface of the photosensitive member 211 is charged by the charging roller 212 to +500 V, and the image exposing device 213 performs the image exposure on the charged region so that an electrostatic latent image corresponding to the intended image is formed.

Then, the electrostatic latent image is opposed to the medium TP1 sent from the timing roller pair 22, and the transfer roller (serving as the opposite electrode in this case) 215 bearing the bias for image writing and supplied from the power source PW3 forms the contrast image corresponding to the electrostatic latent image on the photosensitive member on the medium TP1. In this operation, a peripheral speed ratio θ equal to 1 is set between the peripheral speed of the photosensitive member and the peripheral speed of the transfer roller (opposite electrode roller), and the transfer roller bears the bias of +250 V. Thereby, the image is formed by the Coulomb force acting between the electrostatic field formed in the region, where the photosensitive member and the transfer roller (opposite electrode roller) are opposed to each other, and the chargeable particles contained in the medium TP1.

For the above image formation, the magnet roller 215a arranged within the transfer roller 215 may be driven to rotate for magnetically stirring the developer particles within the medium TP1 so that the flowability of the particles may be improved during the image formation.

The medium on which the image is formed in the above manner is discharged onto the tray TPT through the path 262.

The trays PPT and TPT may be formed of the same tray.

The image forming apparatus A may be provided with a charge eraser, which erases the residual charges on the photosensitive member 211 after the transfer of the toner image onto the medium PP or writing of the image on the medium TP and before the charging by the charging roller 212. This is true also with respect to the image forming apparatuses, which will be described later.

Figure 7:
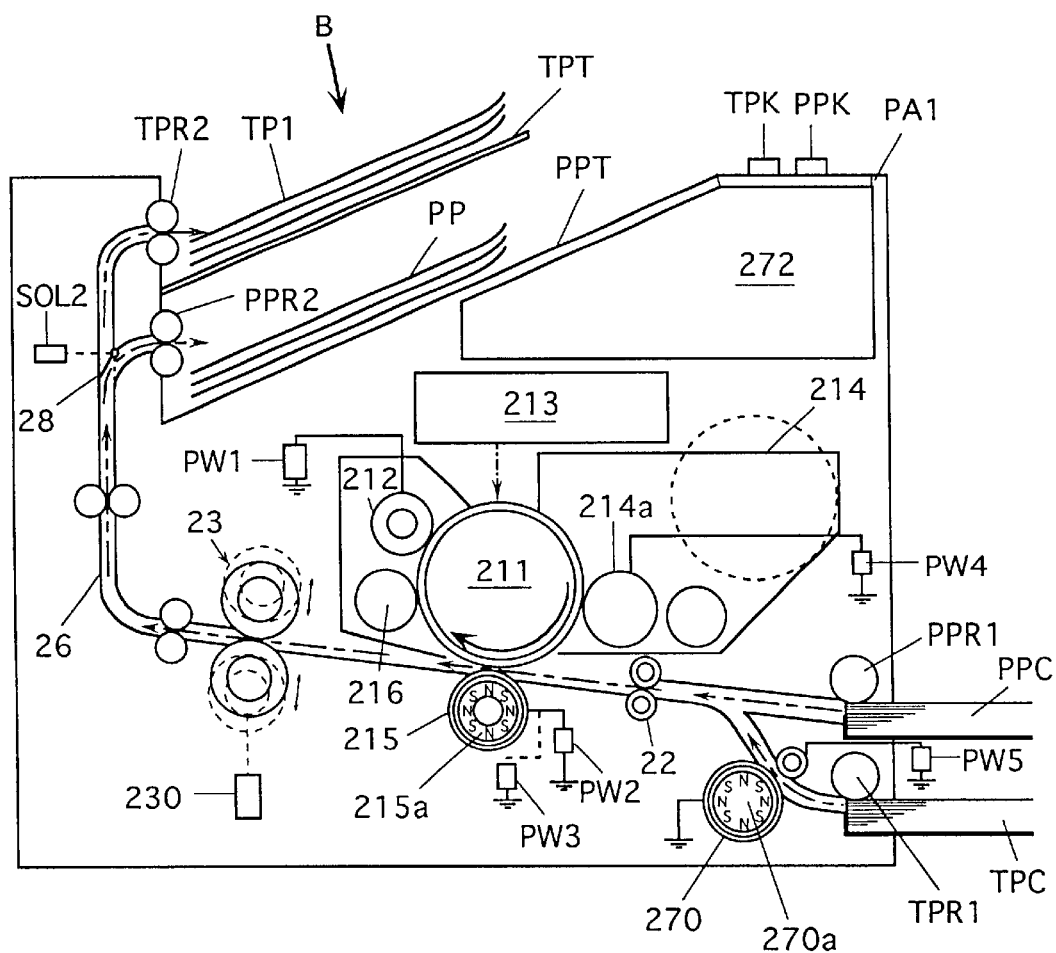
FIG. 7 shows a schematic structure of another example of the image forming apparatus.

<Image Forming Apparatus B in FIG. 7>

An image forming apparatus B differs from the image forming apparatus A shown in FIG. 6 in that the upper and lower rollers of the fixing roller pair 23 can be moved away from each other. For the image formation in the PP mode, a controller 272 for controlling the whole operations of the apparatus B sends an instruction so that a fixing roller moving device 230 utilizing the solenoid sets the upper and lower rollers to the state allowing fixing of the toner image onto the medium PP. For the image formation in the TP mode, the controller 272 sends an instruction so that the fixing roller moving device 230 moves the upper and lower rollers away from each other. In the medium path 26 downstream from the fixing roller pair 23, a switching member 28 driven by a solenoid SOL2 is arranged for sending the medium PP toward the tray PPT and sending the medium TP toward the tray TPT. The position of the member 28 is determined by the solenoid controlled by the controller 272 in accordance with the PP mode and the TP mode.

Structures other than the above are the same as those of the image forming apparatus A. The same portions as those of the apparatus A bear the same reference numbers.

According to the image forming apparatus B, the PP mode image formation using the normal paper sheet and the TP mode image formation using the medium TP1 are as follows.

PP Mode (Electrophotographic Image Formation on the Normal Paper)>

The upper and lower rollers of the fixing roller pair 23 are set for image fixing, and the member 28 occupies a position for sending the medium PP toward the tray PPT. Manners other than the above are similar to those in the case of the image forming apparatus A.

TP Mode (Using Medium TP1)

The upper and lower rollers of the fixing roller pair 23 are moved away from each other so that the medium TP1 can freely move through the fixing roller pair 23, and particularly for preventing damage of the medium TP1 due to contact with the heat roller. The member 28 occupies the position for sending the medium TP1 toward the tray TPT. Manners other than the above are similar to those in the case of the image forming apparatus A.

The trays PPT and TPT may be formed of the same tray.

Figure 8:
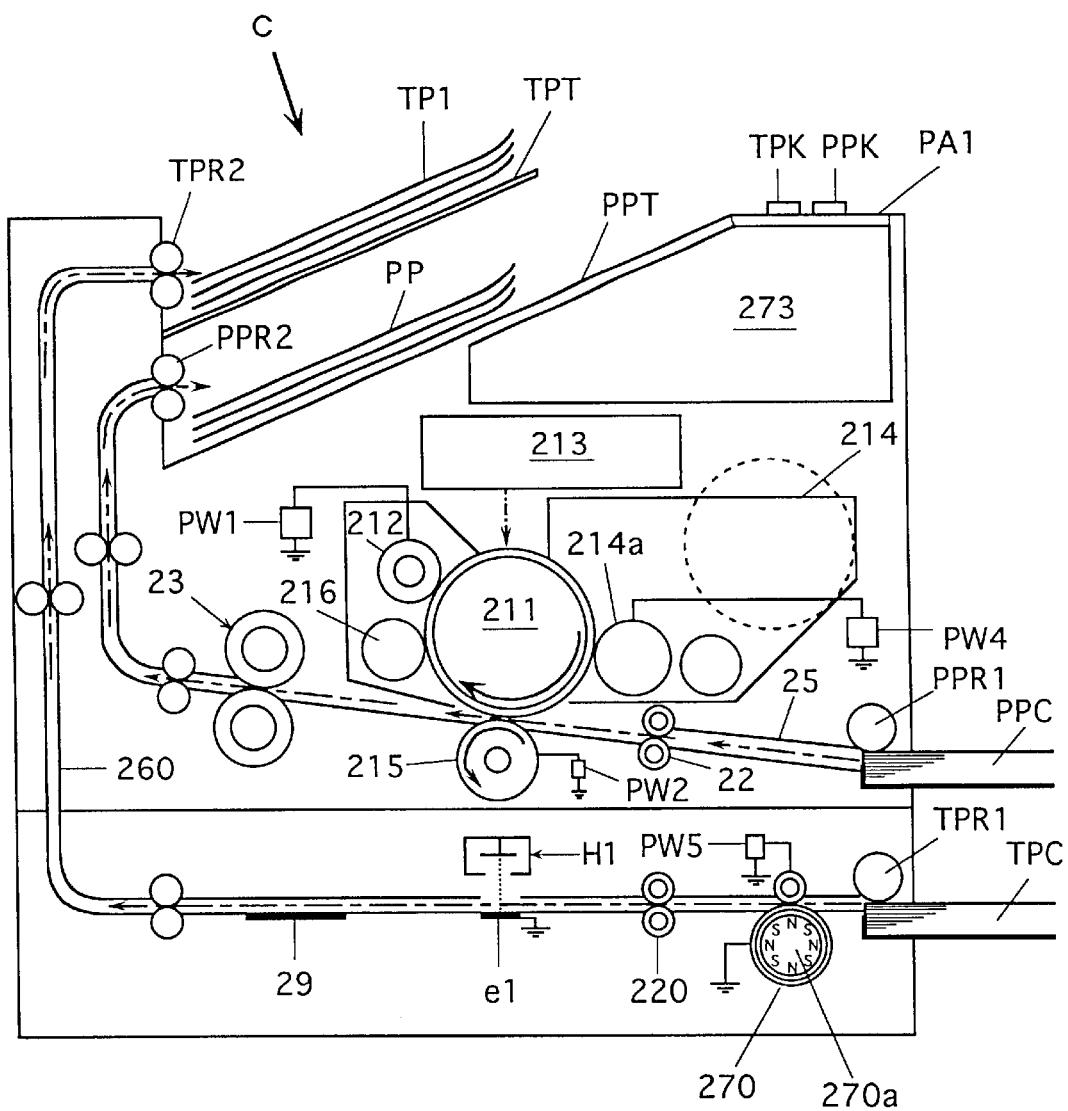
FIG. 8 shows a schematic structure of still another example of the image forming apparatus.

<Image Forming Apparatus C in FIG. 8>

An image forming apparatus C differs from the image forming apparatus A in that the an image forming portion utilizing an ion-flow head H1 is employed for the medium TP instead of the image forming portion for the medium TP in the image forming apparatus A.

The image forming portion for the medium PP has the substantially same structure as the image forming portion of the electrophotographic type in the apparatus A except for the following structures. In the PP-mode image forming portion of the apparatus C, the path 25 is continuously extended to the cassette PPC without the path 252 in the apparatus A. Also, the switching member 24 is removed to provide only the single path extending toward the fixing roller pair 23. Further, the internal magnet roller 215a is removed from the transfer roller 215. Structures other than the above are similar to those of the PP-mode image forming portion in the apparatus A. The same portions as those in the apparatus A bear the same reference numbers. The operation of the image forming portion for the medium PP is controlled by a controller 273 controlling the whole operations of the apparatus C.

A TP-mode image forming portion is provided for the reversible image display medium of the electric field drive type, and includes:

the cassette TPC attached under the cassette PPC, opposed to the medium feed roller TPR1 and provided for the medium TP, the eraser roller pair 270 containing the magnet roller 270a therein, a timing roller pair 220, the ion-flow head H1 for image writing and an opposite electrode e1, a magnet sheet 29 having a magnetized pattern having a plurality of N and S magnetic poles each directed perpendicularly to the medium transporting direction, and opposed to the medium path 260, the medium discharging roller pair TPR2, and the discharge tray TPT, which are arranged in this order.

Among these parts, the substantially same parts as those in the apparatus A bear the same reference numbers.

The operation of the image forming portion for the medium TP is controlled by the controller 273.

Figure 9A:
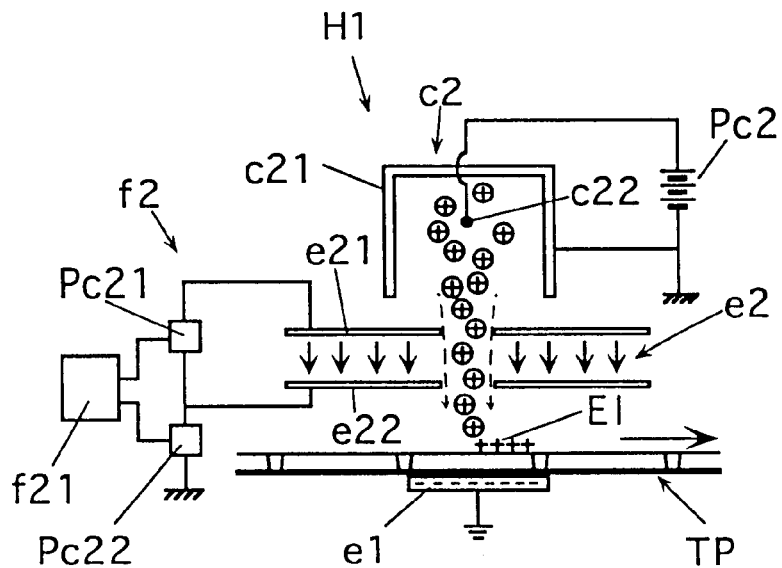
FIGS. 9(A) and 9(B) show, on an enlarged scale, an ion-flow head shown in FIG. 8.
Figure 9B:
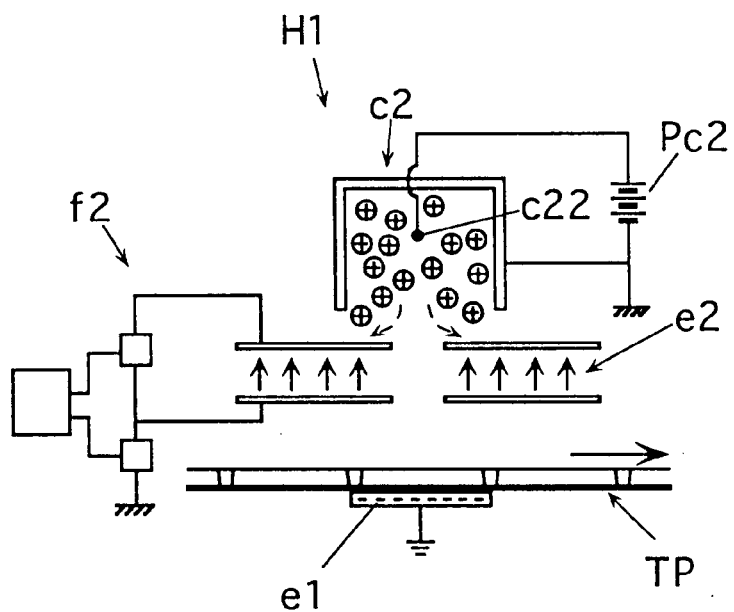

As shown in FIGS. 9(A) and 9(B), the ion-flow head H1 includes a corona ion generating portion c2 for generating corona ions, a write electrode e2 for leading the corona ions thus generated to the surface of the medium TP, and a write electrode control circuit f2 for applying to the write electrode e2 a voltage for leading the positive (or negative) corona ions to pixel corresponding portions on the surface of the medium TP in accordance with the image to be displayed.

The corona ion generating portion c2 includes a corona wire c22 stretched in a shield casing c21, and can generate corona ions by applying a voltage (e.g., a positive or negative voltage of about 4 kV-about 10 kV) from a high voltage power source Pc2. The corona wire c22 may be formed of, e.g., a gold-plated tungsten wire of 60 $\mu$m-120 $\mu$m in diameter.

The write electrode e2 is located near a portion of the shield casing c21 opposed to the medium TP, and is formed of upper and lower electrodes e21 and e22. Corona ions can flow through central apertures in these electrodes e21 and e22.

The electrode control circuit f2 includes a control power source Pc21, a bias power source Pc22 and a controller f21, which can apply to the electrodes e21 and e22 the ion-leading voltage depending on the polarity of the ions to be lead toward the medium TP.

In accordance with the instruction of the controller f21, the positive and negative voltages are applied to the upper and lower electrodes e21 and e22, respectively, so that the positive corona ions can be lead to the medium (FIG. 9(A)). When the negative and positive voltages are applied to the upper and lower electrodes e21 and e22, respectively, the positive corona ions can be confined (FIG. 9(B)).

The opposite electrode (ground electrode in this example) e1 is opposed to the write electrode e2.

The medium TP of the electric field drive type is moved relatively to the head H1. Also, depending on the images to be displayed and in accordance with the instruction from the controller f21, the positive corona ions are selectively led to the pixel corresponding portions on the surface of the medium TP, and particularly are led to the predetermined pixel corresponding portions corresponding to the image to be displayed as shown in FIG. 9(A), and outflow of the ions for the other pixels are prevented as shown in FIG. 9(B).

In the above manners, the image is written.

The discharging wire c22 may be replaced with a solid discharging element.

According to this image forming apparatus C, the PP-mode image formation using the normal paper and the TP-mode image formation using the medium TP1 are performed as follows.

PP Mode (Electrophotographic Image Formation on the Normal Paper)

The image formation is performed similarly to that by the image forming apparatus A.

TP-mode (Using Medium TP1)

For writing the image onto the medium TP1, the medium TP1 accommodated in the cassette TPC is pulled out from the cassette TPC by the feed roller TPR1, and is transported to the timing roller pair 220 through the eraser roller pair 270 so that it comes into contact with the nip portion of the roller pair 220. In this operation, the fore-regist sensor (not shown) detects the leading end of the medium TP1 to determine the timing for writing the image on the medium TP1.

The eraser roller pair 270 carrying the bias voltage of +250 V supplied from the power source PW5 initializes the medium TP1. Further, the rotating magnet roller 270a applies an oscillating magnetic field to the developer containing the magnetic particles contained in the medium TP1 for stirring it so that the flowability of the developer particles is improved to achieve easy initialization of the medium TP1.

The eraser roller pair 270 may be arranged on either upstream to or downstream from the timing roller pair 220. One roller pair may be configured to serve both the eraser roller pair and the timing roller pair.

Then, the medium TP1 sent from the timing roller pair 220 is transported toward the ion-flow head H1.

When the medium TP1 is transported to the head H1, the head H1 forms an electrostatic latent image corresponding to the image to be formed on the medium TP1.

When the medium TP1 bearing the electrostatic latent image passes through the magnet sheet 29, the developer particles are stirred by the oscillating magnetic field, and are moved by the Coulomb force based on the electrostatic latent image so that a contrast image corresponding to the electrostatic latent image is formed.

In this operation, an arbitrary bias may be applied to the conductive layer located on the rear side of the medium TP1. If applied, the bias preferably takes the value intermediate the surface potential of the image portion and the surface potential of the non-image portion.

The medium TP1 bearing the image thus formed is discharged to the tray TPT by the discharge roller pair TPR2.

In the apparatus C, the trays PPT and TPT may likewise be formed of the same tray.

Figure 10:
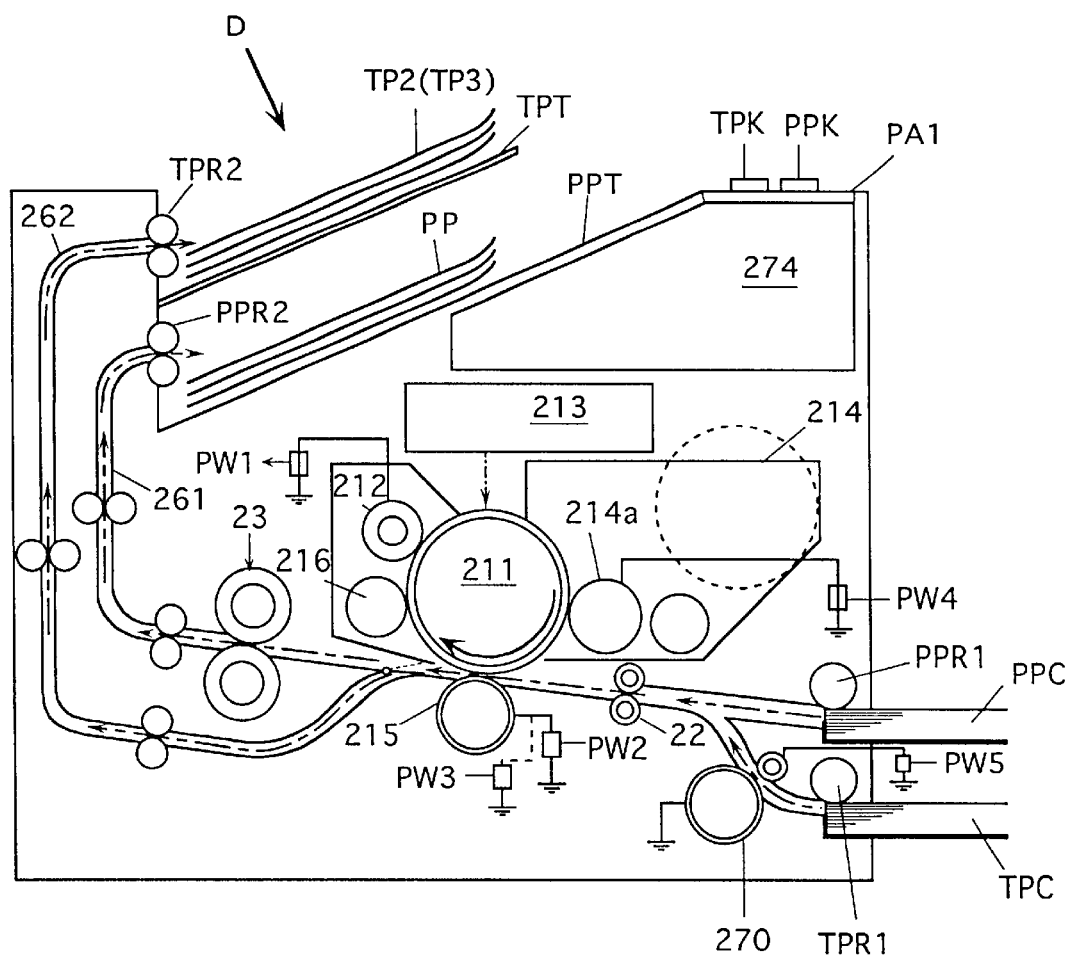
FIG. 10 shows a schematic structure of further another example of the image forming apparatus.

<Image Forming Apparatus D in FIG. 10>

An image forming apparatus D uses the medium TP2 of the electrophoresis type or the medium TP3 of the twist ball type.

The apparatus D differs from the apparatus A in FIG. 6 in that the internal magnet roller 270a is not arranged in the eraser roller pair 270, and the internal magnet roller 215a is not arranged in the transfer roller 215.

Structures other than the above are the same as those of the image forming apparatus A. The same portions as those in the apparatus A bear the same reference numbers.

The operations of the image forming portions effected on the mediums PP and TP are controlled by a controller 274 controlling the whole operations of the apparatus D.

The image forming apparatus D performs the PP-mode image formation using the normal paper as well as the TP-mode image formation using the mediums TP2 and TP3 in the following manners.

PP Mode (Electrophotographic Image Formation Using the Normal Paper)

The operation is the same as that of the image forming apparatus A.

TP Mode (Using Medium TP2)

In the apparatus D, the mediums TP2 of the electrophoresis type are accommodated in the cassette TPC. The medium TP2 in the cassette TPC is pulled out by the feed roller TPR1 from the cassette, and is transported to the timing roller pair 22 through the eraser roller pair 270 so that it comes into contact with the nip portion of the roller pair 22. In this operation, the fore-regist sensor (not shown) detects the leading end of the medium TP2 to determine the timing for writing the image onto the medium TP2.

The eraser roller pair 270 carrying the bias voltage of +250 V supplied from the power source PW5 moves the white developer particles 141 having the electrophoretic mobility in the medium TP2 toward the substrate on the front side (upper side in the figure) so that the medium TP2 is initialized. The medium TP2 thus initialized exhibits a white appearance.

The eraser roller pair 270 may be arranged on either upstream to or downstream from the timing roller pair 22. One roller pair may be configured to serve both the eraser roller pair and the timing roller pair.

The surface of the photosensitive member 211 is charged by the charging roller 212 to +500 V, and the image exposing device 213 performs the image exposure on the charged region so that an electrostatic latent image corresponding to the intended image is formed.

Then, the electrostatic latent image is opposed to the medium TP2 sent from the timing roller pair 22, and the transfer roller (the opposite electrode in this case) 215 bearing the bias, which is supplied from the power source PW3 for image writing, forms the contrast image corresponding to the electrostatic latent image on the photosensitive member on the medium TP2. The transfer roller bears the bias of +250 V. Thereby, the image is formed by moving the white particles 141 to the rear side by the Coulomb force acting between the electrostatic field formed in the region, where the photosensitive member and the transfer roller (opposite electrode roller) are opposed to each other, and the chargeable and movable particles 141 contained in the medium TP2.

The medium TP2 on which the image is formed in the above manner is discharged onto the tray TPT through the path 262.

The trays PPT and TPT may be formed of the same tray.

TP Mode (Using Medium TP3)

Under conditions similar to those for the medium TP2, the image can be formed similarly.

When using the medium TP3, the eraser roller pair 270 initializes the medium so that the rotatable two-color spherical members 151, which are dispersed within the medium TP3 and have an electric anisotropy, are positioned to direct simultaneously the semi-spherical surfaces of the same color upward or downward.

During the image formation, the two-color spherical members 151 within the medium TP3 are rotated in the region, where the photosensitive member 211 and the transfer roller (opposite electrode roller) 215 are opposed to each other, by the electrostatic field formed between them so that the image is formed. The portion where the white surfaces of the members 151 are directed outward exhibits a white appearance. The portion where the colored surfaces 151*a* of the members 151 are directed outward exhibits the same color as the colored surfaces 151*a*.

Figure 11:
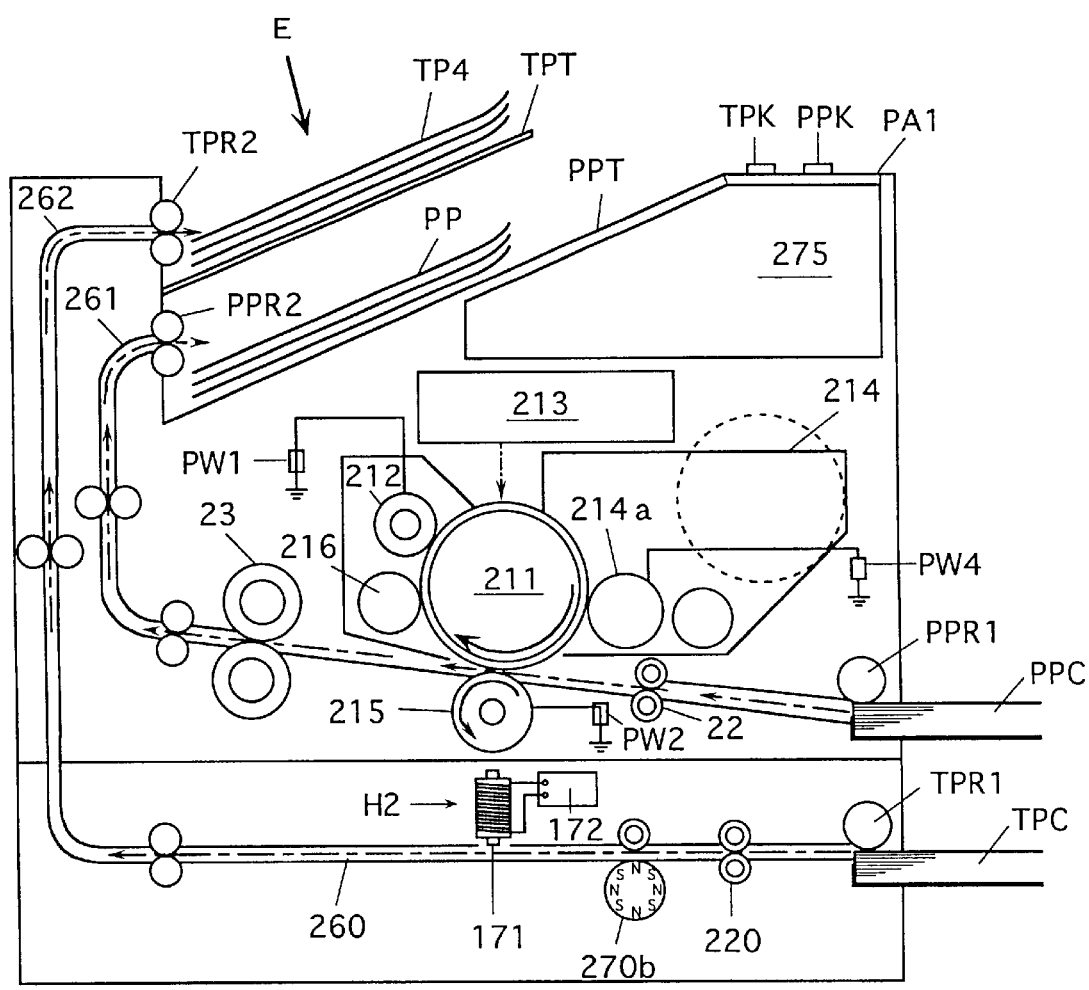
FIG. 11 shows a schematic structure of further another example of the image forming apparatus.

<Image Forming Apparatus E in FIG. 11>

An image forming apparatus E differs from the image forming apparatus C shown in FIG. 8 in that the image forming portion for the medium TP uses the magnetic head H2 instead of the ion-flow head H1.

The image forming portion for the medium TP in the apparatus. E forms the image on the medium TP4 of magnetic drive type.

The image forming portion for the medium PP has the same structure as that of the electrophotographic type in the image forming apparatus C shown in FIG. 8. The same portions as those in the apparatus C bear the same reference numbers. The operations of the image forming portion effected on the medium PP are controlled by a controller 275 controlling the whole operations of the apparatus E.

The TP-mode image forming portion is the image forming portion for the reversible image display medium of the magnetic drive type, and includes:

the cassette TPC provided for the medium TP, arranged under the cassette PPC and opposed to the medium feed roller TPR1, the timing roller pair 220, an eraser roller (magnet roller) 270*b* for medium initialization, the magnetic head H2 for image writing, the medium discharging roller pair TPR2, and the discharge tray TPT, which are arranged in this order.

The magnet roller 270*b* has a double structure, which includes an outer roller for rotation in accordance with the medium passing thereon and an inner magnet portion roller to be driven to rotate.

Among the above parts, the substantially same parts as those in the apparatus C bear the same reference numbers.

The operation of the image forming portion for the medium TP is controlled by the controller 275.

The magnetic head H2 includes a group of electromagnets 171 for magnetically attracting the magnetic developer particles in the medium TP4 toward the substrate on the front side (upper side in the figure), and also includes a DC power source 172 for applying a DC voltage corresponding to the image to be formed to each electromagnet 171. The electromagnets are arranged in the direction perpendicular to the medium transporting direction.

The image forming apparatus E performs the PP-mode image formation using the normal paper as well as the TP-mode image formation using the medium TP4 in the following manners.

PP Mode (Electrophotographic Image Formation Using the Normal Paper)

The image formation is performed similarly to the apparatuses A, C and others.

TP Mode (Using Medium TP4)

For the image writing on the medium TP4, the medium TP4 in the cassette TPC is pulled out by the feed roller TPR1 from the cassette, and is transported to the timing roller pair 220 so that it comes into contact with the nip portion of the roller pair 220. In this operation, the fore-regist sensor (not shown) detects the leading end of the medium TP4 to determine the timing for writing the image onto the medium TP4.

The medium TP4 fed from the timing roller pair 220 is sent through the eraser roller (magnet roller) 270b toward the magnetic head H2. When passing through the eraser roller 270b, the roller 270b rotates to form the oscillating magnetic field so that the medium TP4 is initialized.

The eraser roller pair 270 may be arranged on either upstream to or downstream from the timing roller pair 220. The timing roller pair 220 may serve as the eraser.

The head H2 applies a magnetic field corresponding to the image to be formed on the medium TP4 transported thereto. In the portion subjected to the magnetic field, the magnetic developer particles contained in the medium TP4 move toward the front side of the medium so that the image is formed.

Then, the medium TP4 bearing the image thus formed is discharged onto the tray TPT by the discharge roller TPR2.

The trays PPT and TPT may be formed of the same tray.

<Image Forming Apparatus F in FIG. 12>

An image forming apparatus F has a head H3 of an ink-jet type as an image writing head for the medium PP, and also has the ion-flow head H1 employed in the image forming apparatus C (FIG. 8) as an image writing head for the medium TP. On the upstream and downstream sides of the ion-flow head H1, a timing roller pair 3 also serving as an eraser roller pair and the magnet sheet 29 are arranged, respectively. In the timing roller pair 3, a roller 31 on the lower side in the figure is grounded, and an upper roller 32 is supplied with a bias from the power source PW5.

The apparatus has only one portion for attaching the medium accommodating cassette. The cassette PPC accommodating the mediums PP or the cassette TPC accommodating the mediums TP can be attached to this portion. The medium feed roller PR1 is opposed to the cassette attached thereto.

The medium discharge roller pair PR2 is one in number, and the medium discharge tray PT is also one in number.

Through a medium transporting path 260', the feed roller PR1, the timing roller pair 3 also serving as the eraser roller pair, the ion-flow head H1, the magnet sheet 29, the write head H3 of the ink-jet type carried on a carriage CR, the discharge roller pair PR2 and the discharge tray PT are arranged in this order.

A controller 276 for controlling the whole operations of the image forming apparatus F is arranged in the upper position, and is connected to a control panel PA2, which is provided with, e.g., a PP-mode designating key PPK1 for designating the image formation in the PP mode, a TP-mode designating key TPK1 for designating the image formation in the TP mode and a print start key PK1 for instructing start of the image formation. Such a structure may be employed that the PP mode is designated when the cassette PPC accommodating the mediums PP is attached, and the TP mode is designated when the cassette TPC accommodating the mediums TP is attached. In this case, the mode designating keys PPK1 and TPK1 can be eliminated. The mode designating portion may be similar to those of the medium type detecting device, which will be described later with reference to FIGS. 17(A) to 20(B).

In this image forming apparatus F, the cassette PPC accommodating the mediums PP is attached, the PP-mode designating key PPK1 is depressed and the print start key PK1 is depressed. Thereby, the medium feed roller PR1 opposed to the cassette PPC, the timing roller pair 22 and the ink-jet head H3 operate in accordance with predetermined timing under control of the controller 276 so that the image is formed on the medium PP in the PP mode, and then the medium PP is discharged onto the tray PT. These form the image forming portion for the medium PP. In this PP mode, the timing roller pair 3 does not operate as the eraser roller pair. Also, the ion-flow head H1 does not operate.

The image formation in the PP mode is performed similarly to the image formation by a conventional ink-jet printer.

The cassette TPC accommodating the mediums TP is attached, the TP mode designating key TPK1 is depressed and the print start key PK1 is depressed, whereby the medium feed roller PR1 opposed to the cassette TPC as well as the timing roller pair 22 and the ion-flow head H1 operate in accordance with predetermined timing under control of the controller 276. Further, the magnet sheet 29 operates. Thereby, the image is formed on the medium TP in the TP mode, and then the medium TP is discharged onto the tray PT. These form the image forming portion for the medium TP. In the above TP mode, the timing roller pair 3 operates with the bias for initializing the medium TP supplied to the upper roller 32 from the power source PW5. The head H3 is stopped.

The image formation in the TP mode, which is performed by the image forming apparatus F using the medium TP1, will now be described in greater detail.

TP Mode (Using Medium TP1)

In the apparatus F, the medium TP1 in the cassette TPC is pulled out by the feed roller PR1 from the cassette, and is transported to the timing roller pair 3 also serving as the eraser roller pair so that it comes into contact with the nip portion of the roller pair 3. In this operation, the fore-regist sensor (not shown) detects the leading end of the medium TP1 to determine the timing for writing the image onto the medium TP1.

Then, the medium TP1 moves from the timing roller pair 3 to the ion-flow head H1 while the power source PW5 supplies a bias voltage of +250 V to the upper roller 32 of the timing roller pair 3. In this operation, the medium TP1 is initialized. A magnet roller(s) may be arranged within at least one of the upper and lower rollers 31 and 32, and may be rotated to stir magnetically the developer within the medium TP1 for initializing the medium TP1. The eraser(s) for the medium TP which is independent of the timing roller pair may be arranged upstream to and/or downstream from the timing roller pair.

The medium TP1 fed from the timing roller pair is transported to the ion-flow head H1, which forms the electrostatic latent image corresponding to the intended image on the medium TP1. The medium TP1 bearing the electrostatic latent image passes over the magnet sheet 29, and thereby a contrast image corresponding to the electrostatic latent image is formed thereon. In this operation, an appropriate bias may be applied to the conductive layer on the rear side of the medium TP1. This bias is preferably of a value intermediate the surface potential of the image portion and the surface potential of the non-image portion.

Then, the medium TP1 bearing the image is discharged onto the tray PT.

The portion for attaching the cassette for the medium PP may be arranged independently of the portion for attaching the cassette for the medium TP. Also, the tray for the medium PP may be arranged independently of the tray for the medium TP.

<Image Forming Apparatus G in FIG. 13>

An image forming apparatus G differs from the image forming apparatus F shown in FIG. 12 in that the carriage CR for mounting the ink-jet writing head H3 is replaced with a carriage CR', to which the head H3 and the ion-flow head H1 can be selectively and removably attached. Thus, the heads H1 and H3 can be replaced with each other. Further, a roller pair 4 is employed instead of the magnet sheet 29.

In the TP mode, the upper and lower rollers 41 and 42 of the roller pair 4 occupy the mutually adjacent positions for exhibiting the image forming function similar to that of the magnet sheet 29. In the PP mode, the rollers 41 and 42 occupy escape positions spaced from each other so that the medium PP bearing the ink image can pass therethrough without contact. The lower magnet roller 42 has a double structure, of which outer roller can rotate in accordance with the medium passing thereon. The inner magnet roller is driven to rotate.

The respective portions of the image forming apparatus operate in accordance with designation of the PP-mode image formation and the TP-mode image formation, and more specifically operate in accordance with predetermined timing under control of a controller 277 controlling the whole operations of the apparatus G.

Structures other than the above are similar to those of the image forming apparatus F. The same parts as those in the apparatus F bear the same reference numbers.

The image formation by this image forming apparatus F is performed by mounting the head H3 on the carriage CR' in the PP mode, and mounting the head H1 on the carriage CR' in the TP mode. Manners other than the above are the substantially same as those by the apparatus F.

The image forming apparatuses A–F described above are examples of the first type of image forming apparatus. An example of the second type of image forming apparatus will now be described with reference to FIGS. 14(A) and 14(B).

Figure 14A:
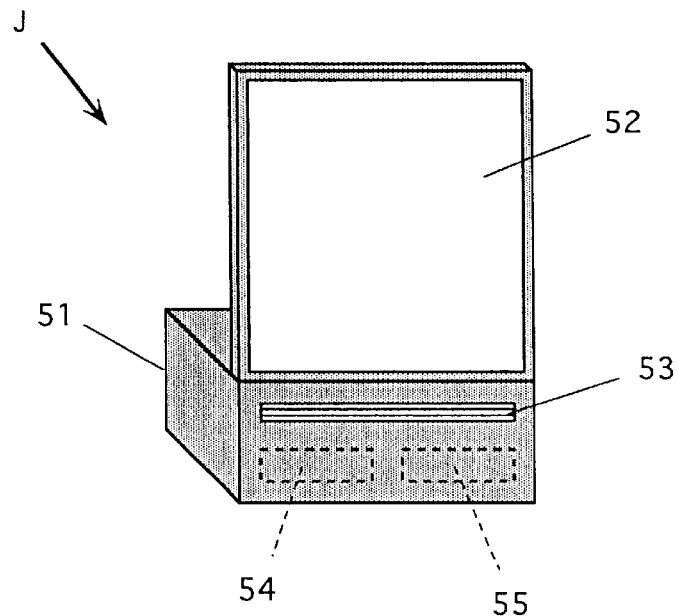
FIG. 14(A) shows a schematic structure of further another example of the image forming apparatus.
Figure 14B:
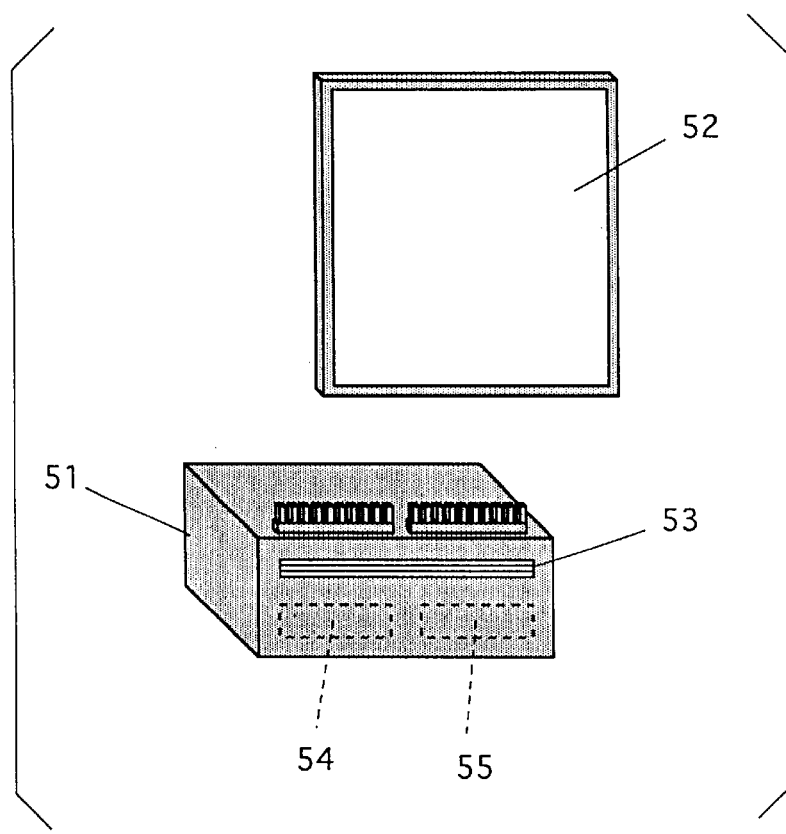
FIG. 14(B) shows a state in which a display is disengaged in the apparatus shown in FIG. 14(A)

An image forming apparatus J shown in FIGS. 14(A) and 14(B) includes an image forming apparatus body 51 as well as a liquid crystal display 52 attachable (connectable) to the body 51. FIG. 14(A) shows a state where the display 52 is attached to the body 51, and FIG. 14(B) shows a state where the display 52 is removed.

The image forming apparatus body 51 is provided with a medium inlet 53 for manually inserting the reversible image display medium TP. The body 51 is internally provided with the TP-mode image forming portion depending on the type of the reversible image display medium to be used, and thus depending on the mediums TP1, TP2 and TP3 of the electric field drive type. The TP-mode image forming portion suitable to the type of the medium may be selected from the TP-mode image forming portions employed in the image forming apparatuses A–D and F as well as other TP-mode image forming portions. The body 51 also contains an image data storing portion 54 for storing the image data, which is transferred from an image information input portion (not shown) such as a personal computer, a scanner or a facsimile machine, and a controller 55 for controlling the whole operations of the image forming apparatus.

The liquid crystal display 52 is of a matrix drive type and of a reflection type, and is internally provided with electrodes for image formation as well as a controller for controlling signals to be applied to the electrodes. The display 52 can store and hold the images even when it is removed from the image forming apparatus body 51 after the image formation. Naturally, it allows rewriting of images. The images can be easily and simply displayed.

According to this image forming apparatus J, the image data transferred from an image information input porion (not shown) is temporarily stored in the image data storing portion 54. Under the control of the controller 55, the liquid crystal display 52 displays the images in accordance with the image data.

After confirming the images, an operator can supply the corresponding medium TP to the internal TP-mode image forming portion through the medium inlet 53 for forming the images on the medium TP. In this operation, the internal TP-mode image forming portion forms the image in accordance with the image data stored in the image data storing portion 54 under the control of the controller 55.

In the image forming apparatus J, for example, the additional writing or the like can be performed onto the medium TP after the last image formation onto the medium TP. When it is desired to view multiple pages at a time, this can be achieved by outputting the images on the plurality of mediums TP, which can be viewed at a time. If it is required to view the multiple pages merely successively, this can be achieved by quickly displaying the images on the liquid crystal display 52. In this manner, the image formation on the medium TP and the image formation on the display 52 can be appropriately selected depending on the situations.

Although in the image forming apparatus J the images can be automatically displayed on the liquid crystal display 52, an instructing portion may be employed for instructing whether the image is to be displayed on the display 52 or not. In connection with the image formation on the medium TP, an instructing portion may likewise be employed for instructing whether it is to be performed or not.

In the apparatus J, the image is automatically formed on the medium TP after inserting the medium TP through the medium inlet 53. For this, it is possible to employ a structure similar to that of a copying machine or the like, which is configured to perform automatically the image formation on a sheet after the sheet is supplied from a manual feeder tray.

In the apparatus J, the medium TP is supplied through the medium inlet 53. Alternatively, the apparatus J may be configured to supply the medium TP from a cassette, as is done in the apparatuses A–D and F.

The apparatus J can display the images on the liquid crystal display 52 of the matrix drive type and the medium TP of the electric field drive type. Therefore, common elements can be employed for image formation on the display 52 and the medium TP, but the TP-mode image forming portion, which can form the image on the medium TP4 of the magnetic drive type, may be also employed.

An example of the third type of image forming apparatus will now be described with reference to FIGS. 15 and 16.

Figure 15:
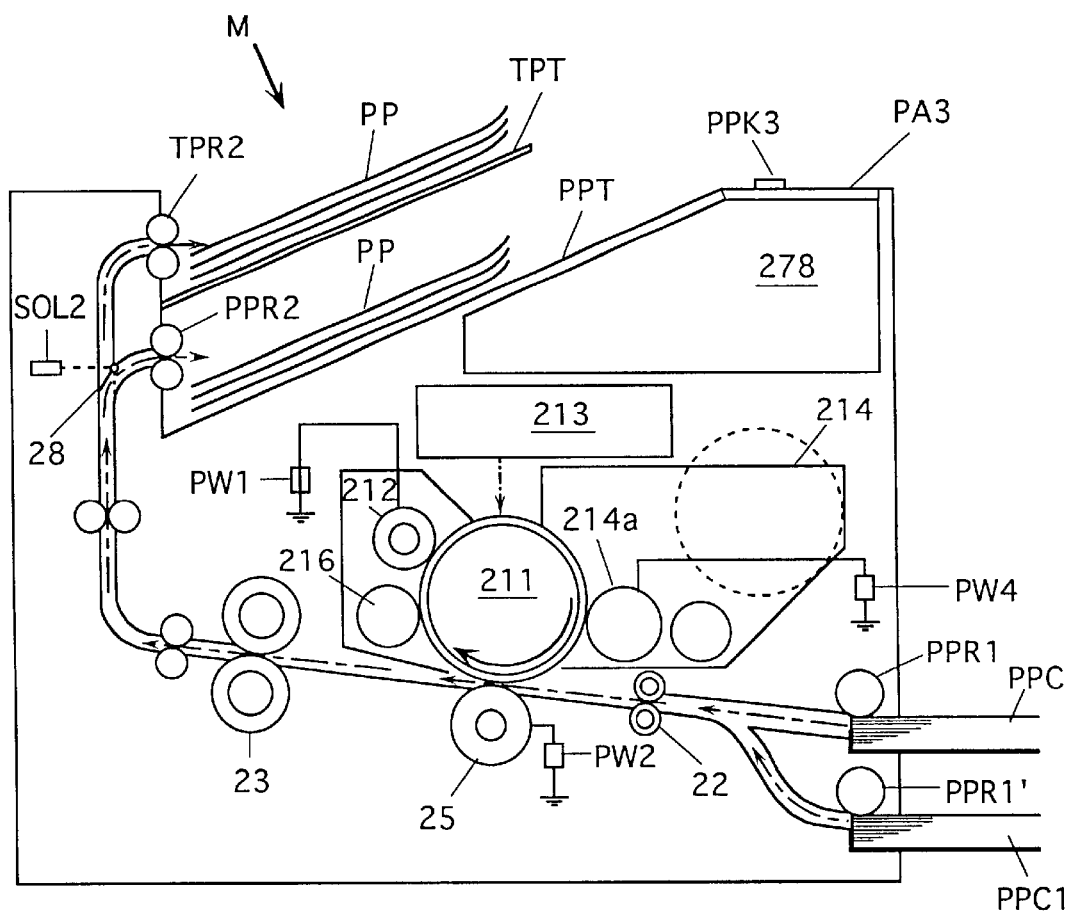
FIG. 15 shows a schematic structure of further another example of the image forming apparatus.

<Image Forming Apparatus M in FIG. 15>

An image forming apparatus M is a modification of the image forming apparatus B in FIG. 7, and has the same basic structure as that of the known image forming apparatus of the electrophotographic type. However, the image forming apparatus M differs from that of the conventional apparatus in that the image formation can be performed in either of the draft mode and the finish mode.

The image forming apparatus M differs from the image forming apparatus B in that:

the eraser roller pair 270 is eliminated, and the internal magnet roller 215a is removed from the transfer roller 215;

a cassette PPC1 for accommodating the mediums PP (normal paper sheet in this example) dedicated to the draft mode as well as a feed roller PPR1' for the same are employed instead of the cassette TPC and the feed roller TPR1 for the medium TP;

the stationary fixing roller pair 23 in the apparatus A shown in FIG. 6 is employed instead of the movable fixing roller pair 23, a controller 278 is employed instead of the controller 272, and a control panel PA3 is employed instead of the control panel PA1; and an image data storing portion Mm (see FIG. 16) is further employed for temporarily storing image data transferred thereto.

The upper cassette PPC accommodates the mediums PP (normal paper sheets) for finished images.

Structures other than the above are the substantially same as those of the apparatus B. The same parts as those in the apparatus B bear the same reference numbers.

Figure 16:
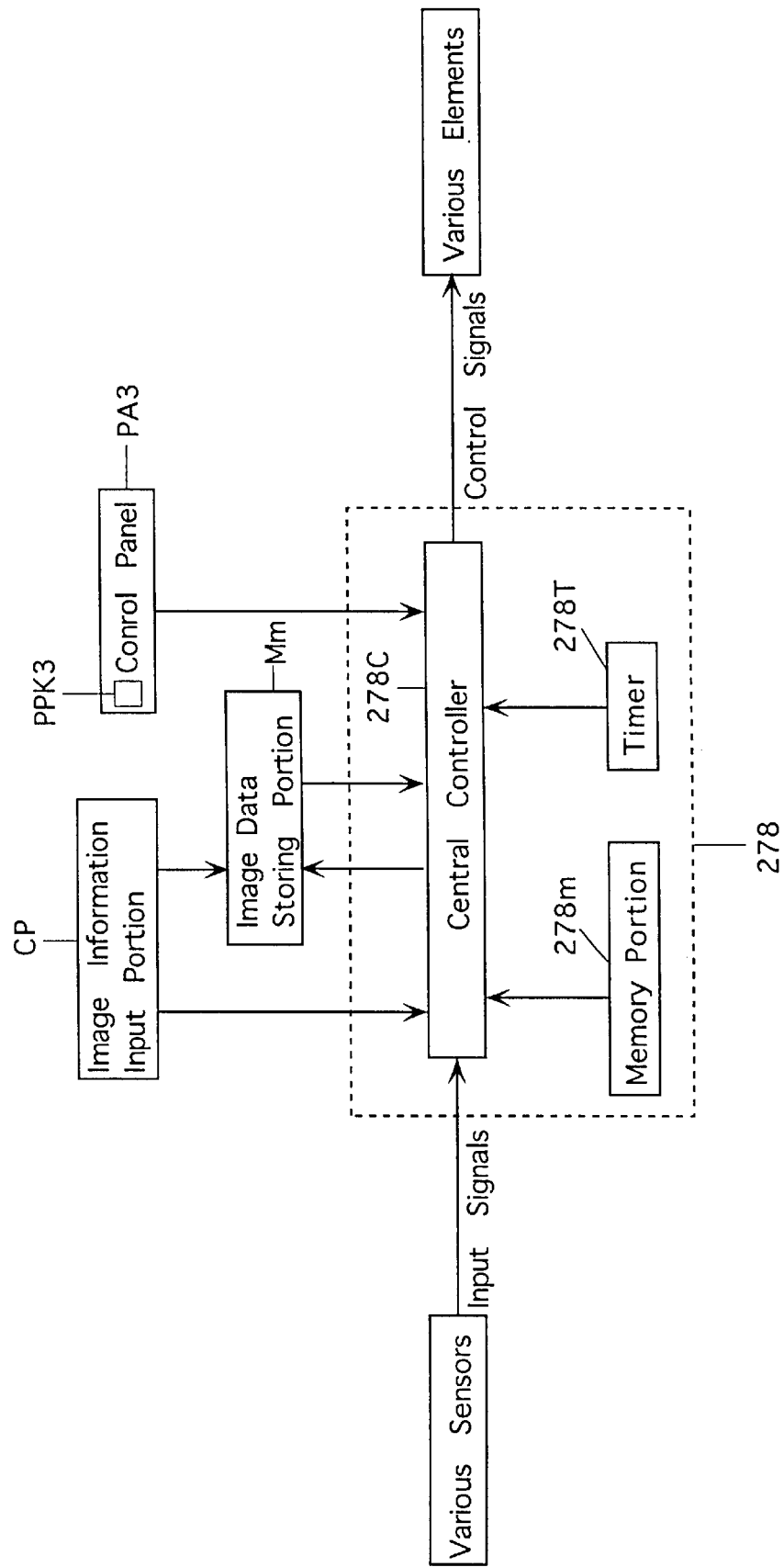
FIG. 16 is a block diagram schematically showing a control circuit in the apparatus shown in FIG. 15.

FIG. 16 is a block diagram schematically showing a control circuit of the apparatus M.

As shown in FIG. 16, a controller 278 in the apparatus M includes a central controller 278C, and also includes a memory portion 278m, which is connected to the central controller, and stores programs for apparatus operation control and various setting data required for executing the programs, and an internal timer 278 T for determining timing for operations of various elements.

The central controller 278C receives information through input ports (not shown) from the fore-regist sensor, a temperature detecting sensor in the fixing roller pair 23, a medium type detecting sensor for the medium supply cassette and other various sensors or the like. The central controller 278C is also connected to an image data storing portion Mm, the control panel PA3 and other various elements to be controlled.

The various elements to be controlled may be:

the rotary drive portion of the photosensitive member 211, the rotary drive portion of the charging roller 212 and the power source PW1 connected thereto, the image exposing device 213, the drive portion of the developing device 214, the drive portion of the transfer roller 215 and the transfer power source PW2 connected thereto, the drive portion of the cleaning roller 216, the drive portions of the medium feed rollers PPR1 and PPR1', the drive portion of the fixing roller pair 23;

the switching member drive solenoid SOL2, the drive portions of the discharge rollers PPR2 and TPR2, and portions relating to the above.

The control panel PA3 is provided with a finish mode key PPK3 for designating and instructing the image formation in the finish mode as well as various kinds of setting keys and others.

The personal computer, facsimile machine and others as well as devices connected to various communication network have image information input portions CP, which can send the image output command to the central controller 278C, and can transfer the image data to the image data storing portion Mm for temporary storage.

The image data stored in the image data storing portion Mm disappears when a predetermined time elapses, or when it is read out for the image formation in the finish mode.

In this image forming apparatus M, the image output instruction is initially sent from the image information input portion CP to the central controller 278C.

In response to this image output command, the image data storing portion Mm temporarily stores the image data transferred from the image information input portion CP.

The central controller 278C has a function of forming a draft image data from the data stored in the image data storing portion Mm. In this case, the central controller 278C forms, e.g., the converted image data of 100 dpi from the image data of 600 dpi stored in the storing portion Mm. With this image data, the image is formed on the medium PP dedicated to the draft mode. When the operator depresses the finish mode key PPK3 on the control panel PA3 after performing the image formation in the draft mode at least one time, the image is formed on the medium PP for the finish image.

When forming the image in the draft mode, the medium PP dedicated to the draft mode and accommodated in the lower cassette PPC1 is pulled out by the feed roller PPR1', and is transported by the timing roller pair 22 so that it comes into contact with the nip portion of the roller pair 22. In this operation, the fore-regist sensor (not shown) detects the leading end of the medium PP, and the timing for writing the image on the medium PP is determined.

In the above operation, the power source PW1 applies a voltage to the charging roller 212 to charge the photosensitive member 211 to +500 V, and then the image exposing device 213 performs the image exposure in accordance with the converted image data of 100 dpi so that an electrostatic latent image is formed on the photosensitive member 211.

This electrostatic latent image moves to the developing device 214, in which the developing roller 214a is supplied with the developing bias of +400 V from the power source PW4.

In this manner, the electric field formed between the electrostatic latent image on the photosensitive member 211 and the developing roller 214a develops the electrostatic latent image with toner to produce a visible images. Thus, development with toner is performed only on the exposed portion.

Then, the transfer roller 215 transfers the toner image formed on the photosensitive member onto the medium PP, which is fed by the timing roller pair 22 in synchronization with the toner image on the photosensitive member. In this operation, the transfer roller 215 is supplied with a bias of −1000 V, and positively chargeable toner is electrostatically transferred onto the medium PP from the photosensitive member.

Thereafter, the cleaning roller 216 cleans the photosensitive member 211 to remove the untransferred toner remaining on the photosensitive member, and the surface potential on the photosensitive member 211 is initialized for the next image formation.

The medium PP bearing the transferred toner image passes through the fixing roller pair 23, whereby the toner image is fixed by the pressure and heat. Thereafter, the medium PP is discharged onto the tray TPT.

The image formation in the finish mode is performed similarly to the image formation on the medium PP dedicated to the draft except for that the feed roller PPR1 pulls out the medium PP for the finish images accommodated in the upper cassette PPC, the image exposing device 213 forms an electrostatic latent image on the photosensitive member 211 in accordance with the image data of 600 dpi stored in the image data storing portion Mm, this image formation erases the image data in the storing portion Mm, and the medium PP bearing the image thus formed is discharged onto the tray PPT.

The image data storing portion Mm has a capacity capable of storing the image data of multiple pages. The storing and erasing of the image information for each page are performed independently of the other pages, but may be performed in batches of the print job. Similarly, the image output in the finish mode after the draft mode is performed page by page, but may be performed in batches of print job.

Although the image forming apparatus M has been described, the control panel PA3 may be provided with a key(s) for selecting and designating the draft mode and the finish mode as well as a key for instructing start of the image formation so that the mode can be freely selected on the side of the image forming apparatus J. Thereby, the image formation may be performed on the medium PP for the draft when the draft mode is designated, and the image formation start instruction key is depressed. Also, the image formation may be performed on the medium PP for the finish when the finish mode is designated, and the image formation start instruction key is depressed.

Further, the control panel PA3 may be provided with a key(s) for designating the draft mode and instructing start of the image formation in the draft mode, and a key(s) for designating the finish mode and instructing start of the image formation in the finish mode so that the image is formed on the medium PP for the draft when the former key(s) is depressed, and the image is formed on the medium PP for the finish when the latter key is formed.

For example, the control panel PA3 may be provided with a key for selecting the cassette PPC1 accommodating the medium PP dedicated to the draft mode as well as a key for selecting the cassette PPC accommodating the medium PP dedicated to the finish mode so that the mode can be designated by designating the cassette.

The apparatus M is provided with the two cassette attaching portions for attaching the draft mode cassette PPC1 and the finish mode cassette PPC, respectively. However, only one cassette attaching portion may be employed, and a medium type detecting device may be employed for detecting whether the image display medium in the cassette attached to the attaching portion is the medium PP dedicated to the draft mode or the medium PP for the finish mode so that the mode can be designated based on the cassette and/or the medium accommodated therein by the medium type detecting device. Such setting may be employed that at least the first image formation is performed in the draft mode similarly to the apparatus J, and when the cassette PPC is attached after at least one draft mode image formation and the medium type detecting device detects the finish medium PP, the mode is changed to the finish mode.

Although the apparatus M includes the two discharge trays, it may include only one.

In the apparatus M, the image formation in the draft mode is effected on the medium PP dedicated to the draft mode, and the image information in the finish mode is effected on the medium PP for the finish. Alternatively, the image formation may be effected on the same medium PP in both the draft mode and the finish mode.

Instead of the apparatus M, an image forming apparatus may be employed, which is provided with the image forming portion for the medium TP employed in any one of the image forming apparatuses A–F already described, and is configured such that the image can be formed on the medium TP dedicated to the draft mode in the draft mode, and the image can be formed on the medium TP dedicated to the finish mode in the finish mode, or such that the image can be formed on the same medium TP in either the draft mode or the finish mode.

Further, an image forming apparatus may be employed, which has the same basic structure as the image forming apparatuses A–F already described or another structure capable of image formation on either the medium PP and the reversible image display medium TP, and is configured such that the draft image is formed on the medium TP, and the finish image is formed on the medium PP.

In this case, at least the first image formation is performed on the medium TP in the draft mode, and the image formation is performed on the medium PP in the finish mode when the finish mode is designated after at least one draft mode image formation. Alternatively, such a structure may be employed that can select the image formation in the draft mode using the medium TP and the image formation in the finish mode using the medium PP.

The apparatus M converts the image data for the draft mode by reducing the resolution from the original value. However, the image data conversion for the draft mode is not restricted to this, as already described.

For example, if the image data sent from the image information input portion CP has a resolution of 1200 dpi, and the solid portion thereof has an image density of 100%, the finish mode may be executed by forming image in accordance with the image data, and the draft mode may be executed in accordance with converted data, which is prepared by conversion and has a resolution of 300 dpi and a solid portion has an image density of 70%.

Finally, some examples of the medium type detecting device in the case where only one cassette attaching portion is provided will now be described with reference to FIGS. 17(A) to 20(B).

The medium type detecting device shown in FIGS. 17(A)–17(C) includes a cassette CAS1, which is provided at a corner of its bottom with a light transmission window LW, and can accommodate either the mediums PP (or mediums TP) dedicated to the draft mode and the mediums PP for the finish mode, as well as a light emitting element LE and a light receiving element LR, which are located above and below the light transmitting window LW when the cassette is attached to the image forming apparatus body.

Figure 17A:
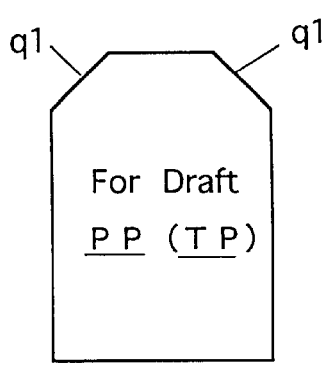
FIGS. 17(A) to 17(C) show by way of example a medium type detecting device.
Figure 17B:
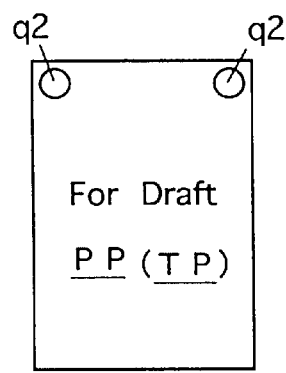
Figure 17C:
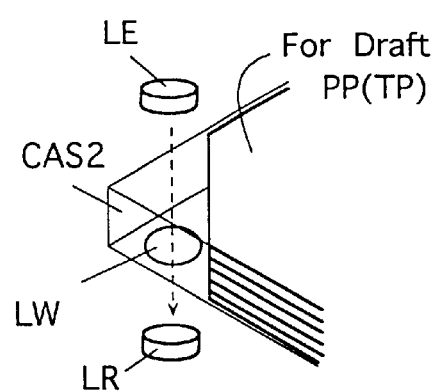

This cassette accommodates the mediums PP (mediums TP) for the draft, each of which has a cut corner q1 as shown in FIG. 17(A), or is provided at its corner with a through hole q2. Thereby, the cut corner q1 or the through hole q2 of the medium is opposed to the light emitting and receiving elements, and the light receiving element LR detects the light emitted from the light emitting element LE so that it is possible to determine that the accommodated medium is the medium PP (medium TP) for the draft.

When the cassette CAS1 attached to the apparatus body accommodates the mediums PP for the finish, each of which has neither a cut corner nor a through hole, the light receiving element LR cannot detect the light emitted from the light emitting element LE so that the medium PP for the finish can be detected.

Figure 18A:
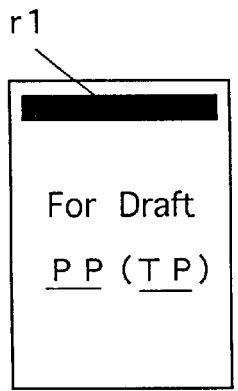
FIGS. 18(A)–18(C) show another example of the medium type detecting device.
Figure 18B:
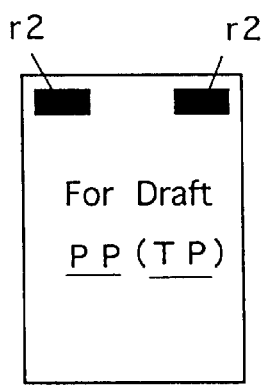
Figure 18C:
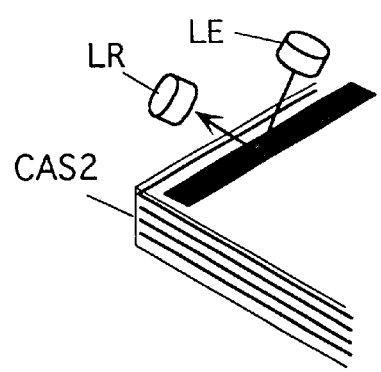

The medium type detecting device shown in FIGS. 18(A)–18(C) includes the light emitting element LE and the light receiving element LR, which are located in the positions opposed to the mediums accommodated in a cassette CAS2 attached to the image forming apparatus body as shown in FIG. 18(C). This cassette CAS2 can accommodate the mediums PP (or medium TP) dedicated to the draft mode as well as the mediums PP for the finish mode.

When the cassette attached to the apparatus body accommodates the mediums PP (mediums TP) for draft, each of which is provided at its end with a light reflection surface r1 or r2, as shown in FIGS. 18(A) or 18(B), the light emitted from the light emitting element LE is reflected by the reflection surface r1 or r2 to the light receiving element LR. Thereby, the device can detect that the medium PP (medium TP) for the draft is in the cassette.

When the cassette CAS2 accommodating the medium PP for the finish, which is not provided with the reflection surface, is attached to the apparatus body, the light receiving element LR cannot detect the light emitted from the light emitting element LE, or can detect only a small amount of light so that the device can detect that the medium PP for the finish is in the cassette.

Figure 19A:
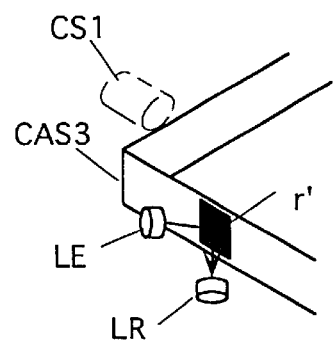
FIGS. 19(A) and 19(B) show still another example of the medium type detecting device.
Figure 19B:
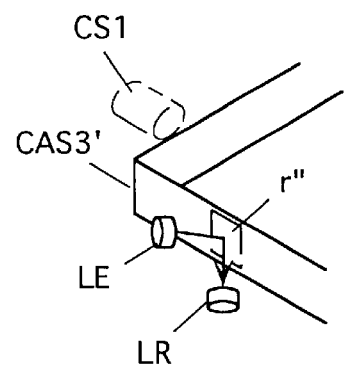

The medium type detecting device shown in FIGS. 19(A) and 19(B) includes:

a cassette CAS3 used for accommodating the mediums PP (or mediums TP) dedicated to the draft mode and having a high reflection density surface r' on its side surface, a casette CAS3' used for accommodating the medium PP for the finish and having a low reflection density surface r" on its side surface, and a cassette sensor CS1 for detecting the fact that the cassette is attached to the apparatus body as well as the light emitting element LE and the light receiving element LR opposed to the reflection surface r' or r" of the cassette attached to the body.

When the cassette CAS3 is attached, the cassette sensor CS1 detects the attached cassette. In this state, when the light emitting element LE and the light receiving element LR detect the high reflection density surface r', the device detects that the cassette accommodating the medium PP (or medium TP) dedicated to the draft is attached.

When the cassette CAS3' is attached, the cassette sensor CS1 detects the attached cassette. In this state, when the light emitting element LE and the light receiving element LR detect the low reflection density surface r", the device detects that the cassette accommodating the medium PP for the finish is attached.

The reflection surface r' may be formed of a low reflection density surface, and the reflection surface r" may be formed of a high reflection density surface.

Figure 20A:
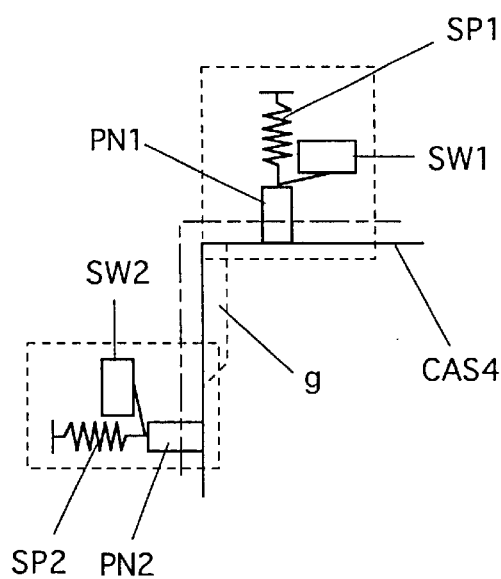
FIGS. 20(A) and 20(B) show further another example of the medium type detecting device.
Figure 20B:
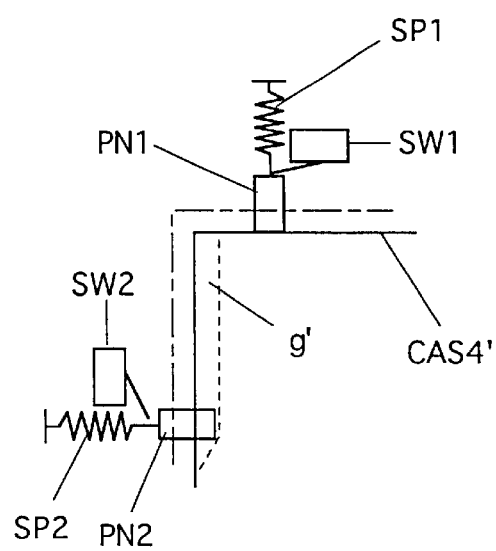

A medium type detecting device shown in FIGS. 20(A) and 20(B) includes two sets of sensors, which are arranged on the cassette attaching portions of the image forming apparatus body, and more specifically includes:

a sensor formed of a pin PN1, which can be pushed by a front end surface of the cassette while it is being attached, and thereby is retreated against a spring SP1, and a switch SW1 activated by the retreating pin PN1, and a sensor formed of a pin PN2 which is fitted to a groove g arranged on the side surface of the cassette while it is being attached, is pushed back against a spring SP2 to activate the switch SW2 by the side portion of the cassette not provided with the groove g if the groove g is short because it is formed in the cassette CAS4 accommodating the medium PP (medium TP) for the draft, and does not move backward from the position fitted into a groove g' if the groove g' is arranged in the cassette CAS4' for accommodating the finish medium PP, and thus is long.

When both the switches SW1 and SW2 are activated, it is determined that the mediums PP (mediums TP) for the draft mode are to be handled. When only the switch SW1 is activated, it is determined that only the mediums PP for the finish are to be handled.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
a first image forming portion for forming an image on a normal image display medium; and
a second image forming portion for forming an image on a reversible image display medium, wherein
said second image forming portion for forming the image on said reversible image display medium is configured to form the image on the reversible image display medium of an electric field drive type by an electric field corresponding to the image to be formed, and
said reversible image display medium of the electric field drive type includes dry developer contained in developer containing cell(s) formed between two substrates opposed to each other with a predetermined gap therebetween, and said dry developer contains at least two kinds of frictionally chargeable dry developer particles having different chargeable polarities and having different optical reflection densities.

2. The image forming apparatus according to claim 1, wherein
said reversible image display medium of the electric field drive type includes dry developer contained in developer containing cell(s) formed between two substrates opposed to each other with a predetermined gap therebetween, said dry developer contains at least two kinds of frictionally chargeable dry developer particles having different chargeable polarities and having different optical reflection densities, at least one of said two kinds of the developer particles are magnetic particles having the frictional chargeability, and said second image forming portion has a device for magnetically stirring the dry developer particles for forming the image by the electric field on said reversible image display medium.

3. An image forming apparatus comprising:
a reversible image display having at least an electrode among elements for driving an image display region to form an image;
a first image forming portion for forming the image on said reversible image display; and
a second image forming portion for forming an image on a reversible image display medium not having an electrode, wherein
said image forming portion for forming the image on said reversible image display medium is configured to form the image on the reversible image display medium of an electric field drive type by an electric field corresponding to the image to be formed, and
said reversible image display medium of the electric field drive type includes dry developer contained in developer containing cell(s) formed between two substrates opposed to each other with a predetermined gap therebetween, and said dry developer contains at least two kinds of frictionally chargeable dry developer particles having different chargeable polarities and having different optical reflection densities.

4. An image forming apparatus comprising:
a reversible image display having at least an electrode among elements for driving an image display region to form an image;
a first image forming portion for forming the image on said reversible image display; and
a second image forming portion for forming an image on a reversible image display medium not having an electrode, wherein
said image forming portion for forming the image on said reversible image display medium is configured to form the image on the reversible image display medium of an electric field drive type by an electric field corresponding to the image to be formed, and
said reversible image display medium of the electric field drive type includes dry developer contained in developer containing cell(s) formed between two substrates opposed to each other with a predetermined gap therebetween, said dry developer contains at least two kinds of frictionally chargeable dry developer particles having different chargeable polarities and having different optical reflection densities, at least one of said two kinds of the developer particles are magnetic particles having the frictional chargeability, and said second image forming portion has a device for magnetically stirring the dry developer particles for forming the image by the electric field on said reversible image display medium.

5. An image forming apparatus comprising:

an image data storing portion for storing image data;

a draft image forming portion for forming an image on a first image display medium in a draft mode;

a finish image forming portion for forming an image on a second image display medium in a finish mode, said second image display medium composed of a material different from said first image display medium; and a draft image data forming portion for forming draft image data from the image data stored in said image data storing portion, wherein said draft image forming portion forms the image on the first image display medium in accordance with the draft image data formed by said draft image data forming portion, and said finish image forming portion forms the image on the second image display medium in accordance with the image data stored in said image data storing portion.

6. The image forming apparatus according to claim 5, further comprising:

a mode designating portion for designating at least either of the draft mode or the finish mode, wherein said draft image forming portion forms the image on the first image display medium in accordance with the draft image data formed by said draft image data forming portion when the draft mode is designated by said mode designating portion, and said finish image forming portion forms the image on the second image display medium in accordance with the image data stored in said image data storing portion when the finish mode is designated by said mode designating portion.

7. The image forming apparatus according to claim 6, wherein said mode designating portion includes an image formation instructing portion for instructing at least either of the draft image formation or the finish image formation.

8. The image forming apparatus according to claim 5, further comprising:

a portion for attaching a first image display medium accommodating cassette, a portion for attaching a second image display medium accommodating cassette, and a cassette designating porting for selecting and designating the first image display medium accommodating cassette and the second image display medium accommodating cassette, wherein the draft mode and the first image display medium accommodating cassette are designated, or the finish mode and the second image display medium accommodating cassette are designated by said cassette designating portion.

9. The image forming apparatus according to claim 5, further comprising:

an image display medium accommodating cassette attaching portion, and a medium type detecting device for detecting whether the image display medium in the cassette attached to said image display medium accommodating cassette attaching portion is the second image display medium for finish mode or the first image display medium for draft mode, wherein said finish mode is designated in response to detection of the second image display medium by said medium type detecting device, and the draft mode is designated in response to detection of the first image display medium by said medium type detecting device.

10. The image forming apparatus according to claim 5, wherein said finish image forming portion forms the image on the second image display medium in accordance with the image data stored in said image data storing portion after the image formation on the image display medium by said draft image forming portion.

11. The image forming apparatus according to claim 5, wherein said draft image data forming portion forms image data differing from the image data stored in said image data storing portion, and being image data of a low resolution, monochrome image data, image data of low-level gray scale, image data of a reduced image output area, image data for displaying data of multiple pages on one page, image data of reduced image density or a combination of at least two of them.

12. The image forming apparatus according to claim 5, further comprising:

a plurality of portions for attaching image display medium accommodating cassettes respectively accommodating the first image display medium and the second image display medium.

13. The image forming apparatus according to claim 5, wherein said first image display medium on which the draft image forming portion forms the image is a reversible medium.

* * * * *